United States Patent [19]

Kitajima et al.

[11] Patent Number: 5,091,722
[45] Date of Patent: Feb. 25, 1992

[54] GRAY SCALE DISPLAY

[75] Inventors: Masaaki Kitajima, Hitachiota; Jun-ichi Ohwada; Yoshiharu Nagae, both of Hitachi, all of Japan

[73] Assignee: Hitachi, Ltd., Tokyo, Japan

[21] Appl. No.: 252,605

[22] Filed: Oct. 3, 1988

[30] Foreign Application Priority Data

Oct. 5, 1987 [JP] Japan .................. 62-249832

[51] Int. Cl.$^5$ .................................................. G09G 3/36
[52] U.S. Cl. .................................. 340/784; 340/805; 340/793; 350/333; 358/241
[58] Field of Search ............ 340/784, 805, 767, 793, 340/781; 358/160, 163, 230, 236, 241; 350/331 R, 332, 333

[56] References Cited

U.S. PATENT DOCUMENTS

| | | | |
|---|---|---|---|
| 4,353,062 | 10/1982 | Lorteije et al. | 340/767 |
| 4,486,747 | 12/1984 | Okamoto et al. | 340/793 |
| 4,488,150 | 12/1984 | Kanatani | 340/793 |
| 4,554,539 | 11/1985 | Graves | 340/781 |
| 4,591,902 | 5/1986 | Masubuchi | 340/793 |
| 4,686,575 | 8/1987 | Shimada et al. | 340/767 |
| 4,745,485 | 5/1988 | Iwasaki | 358/236 |
| 4,859,998 | 8/1989 | Kawamura et al. | 340/784 |

FOREIGN PATENT DOCUMENTS 0236198  9/1987  European Pat. Off. .
61-116334  6/1986  Japan .
2070308  9/1981  United Kingdom .
2124816  2/1984  United Kingdom .

OTHER PUBLICATIONS

Niwa et al.; "LCTV Addressed by MIM Devices"; 1984, SID Digest; vol. XV; pp. 304–307.

Primary Examiner—Ulysses Weldon
Assistant Examiner—M. Fatahiyar
Attorney, Agent, or Firm—Antonelli, Terry, Stout & Kraus

[57] ABSTRACT

A gray scale display, which is provided with a liquid crystal panel consisting of switching elements and a liquid crystal layer superposed thereon; a digital-time function transforming device for transforming digital signals including gray scale information into time function signals; and a time function-gray scale transforming device for sampling a brightness reference signal varying with respect to time, responding to the time function signals and generating gray scale signals corresponding to the signal voltage applied to the switching elements. The time function-gray scale transforming device, in which the brightness reference signal is inputted, samples the signal, responding to time function signals such as a pulse phase signal, a pulse width signal, etc., to obtain a signal voltage. In this way it is possible to reduce the size of a signal voltage generating circuit and to lower signal speed of the operation of the circuit.

40 Claims, 28 Drawing Sheets

GRAY SCALE DISPLAY

BACKGROUND OF THE INVENTION

This invention relates to a method for displaying a gray scale for a display and a display device whose brightness can be controlled by varying the amplitude of the voltage applied thereto, and in particular to a gray scale displaying device suitable for a TFT (Thin Film Transistors) liquid crystal display.

Prior art devices for the liquid crystal active matrix display, which consists of 3-terminal switching elements represented by TFTs or 2-terminal non-linear switching elements represented by MIMs (Metal Insulator Metal) and a liquid crystal layer superposed thereon for displaying images are described in JP-A-61—128292 (FIG. 1), JP-A-61—116334 (FIG. 2) and SID 84 DIGEST (1984) pp. 304 307 (FIG. 3).

The signal side circuit of the liquid crystal display indicated in FIG. 1 is composed of a shift register 23, a latch circuit 24 and a group of 2-value switching elements 25.

The group of 2-value switching elements 25 is constituted by one-out-of-two multiplexers, each of which selects either one of the $V_D$ or GND levels and outputs it as a signal voltage.

This signal voltage is inputted in liquid crystal elements 26b through TFTs 26a in a TFT liquid crystal panel 26. The brightness of a liquid crystal element 26b varies according to the level of the signal voltage. As the result, an image is displayed on the TFT liquid crystal panel 26.

However, by this driving method, in order to obtain a number of gradations in brightness greater than 2, the signal voltage should have a plurality of levels corresponding to the number of gradations. Consequently, it is necessary to switch the voltage levels by using a great number of switches.

For this reason this method is disadvantageous, not only because the construction of the signal circuit is complicated but also because the cost for ICs increases, when the signal circuit is constructed by using ICs.

On the other hand, FIG. 2 indicates a prior art example of the intermediate gradation displaying driving circuit A video signal $V_s$ (analogue voltage) is time-sequentially sampled by a sampling holder 29 and inputted in TFTs 32a through a buffer circuit.

For example, for a TV display, when it is assumed that the number of pixels in the horizontal direction of a TFT liquid crystal panel 32 is 500, the sampling time of the sampling switch 29 is about 0.1 $\mu$s. Consequently, the driving frequency of a shift register 28 is 10 MHz. When the video signal is sampled with such a high speed, the sampling is imperfect and it is not possible to obtain any uniform display.

Further, for a highly fine display having a number of displaying pixels of 1000×1000 the driving frequency of the shift register 28 is further increased, which gives rise to a problem such as cost increases, etc., specifically when it is composed of ICs.

FIG. 3 shows another prior art example, in which reference numeral 33 is an X-driving circuit; 34 is a Y-driving circuit; 35 is an MIM two-terminal element; 36 is a liquid crystal element; and 37 is an electric switch.

A display signal inputted in the X-driving circuit 33 is sampled successively by the electronic switch 37 during one horizontal scanning period and applied to the MIM two-terminal element 35.

If the display signal were a video (analogue) signal, a gray scale display would be possible. However, by this method, when the number of pixels in the horizontal direction is increased, the sampling time is shortened. As the result, an insufficiently high voltage is applied to the liquid crystal element 36, which gives rise to problems such as lower contrast, lack of a uniform display, etc.

In other words, in the prior art gray scale displaying methods, the sampling frequency for the video signal is too high, and further the construction of the output stage of the driving circuit is complicated, which gives rise to problems, specifically when a circuit for driving a highly fine display should be integrated.

SUMMARY OF THE INVENTION

The object of this invention is to provide a gray scale displaying device capable of solving the problems described above and most suitable for construction it by using ICs.

The above object can be achieved by providing a gray scale display with a liquid crystal panel consisting of switching elements and a liquid crystal layer superposed thereon; digital-time function transforming means transforming digital signals including gray scale information into time function signals; and time function-gray scale transforming means sampling a brightness reference signal varying with respect to time, responding to the time function signals and generating gray scale signals corresponding to the signal voltage applied to the switching elements.

The time function-gray scale transforming means, in which a brightness reference signal is inputted, samples the signal, responding to time function signals such as a panel phase signal, a pulse width signal, etc. and generates a signal voltage.

As a result, not only the circuit for generating the signal voltage can be simplified, but also the operation speed of the circuit can be lowered.

DESCRIPTION OF THE PREFERRED EMBODIMENTS

Figure 1:
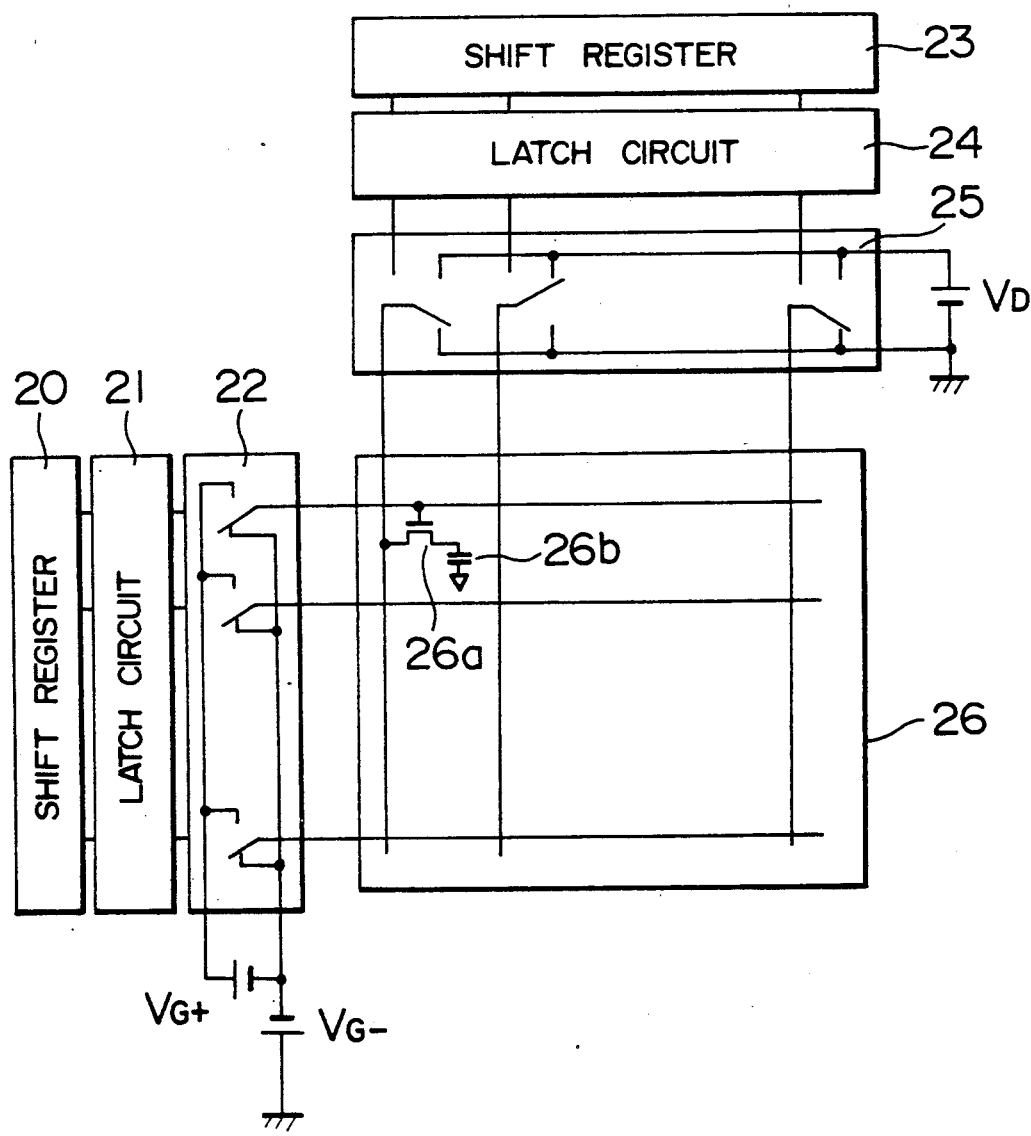
FIGS. 1 to 3 are block diagrams illustrating three different prior art liquid crystal display devices.
Figure 2:
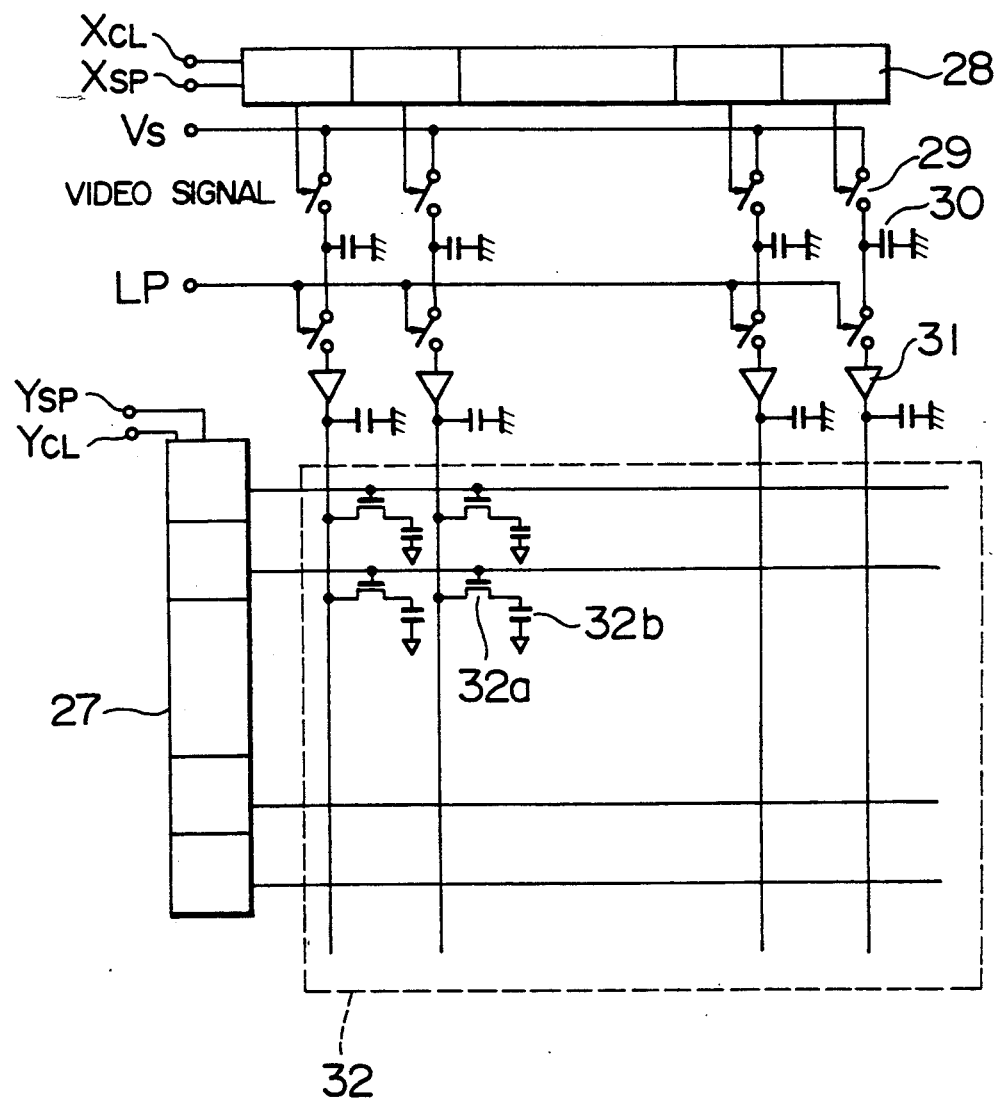
Figure 3:
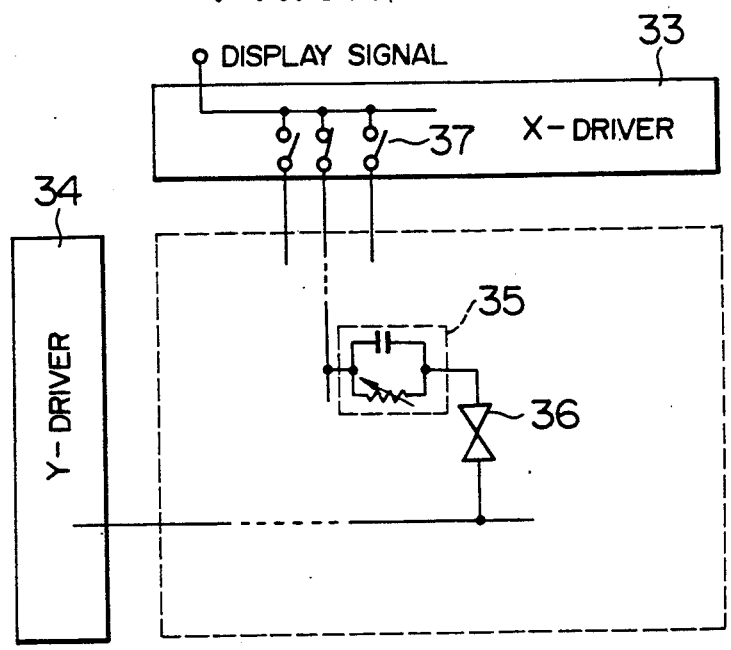
Figure 4:
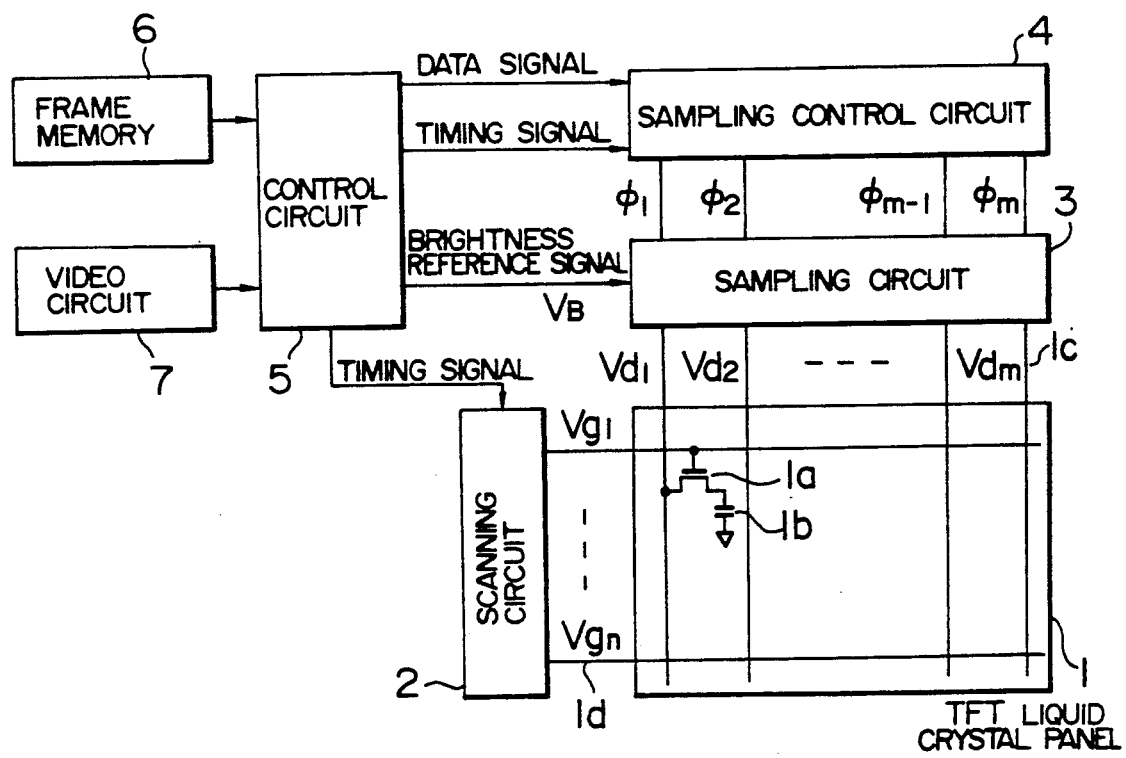
FIG. 4 is a block diagram illustrating an embodiment of this invention.

Hereinbelow several embodiments of this invention will be explained in detail. FIG. 4 illustrates an example of the construction of a whole display device according to this invention. The device consists of a TFT liquid crystal panel 1, a scanning circuit 2, a sampling circuit 3 acting as a time function-gray scale transforming means, a sampling control circuit 4 acting as a digital-time function transforming means, a control circuit 5, a frame memory 6 and a video circuit 7.

The TFT liquid crystal panel 1 is composed of TFTs 1a acting as switching elements, a plurality of signal lines 1c feeding a liquid crystal layer 1b and the TFTs 1a with voltage and a plurality of scanning lines 1d. The scanning circuit 2 generates a signal corresponding to a scanning voltage for scanning the signal lines 1d one after another, which is applied to a scanning line 1d.

Into the sampling control circuit 4 are inputted a data signal and a timing signal determining the state of the brightness of the liquid crystal 1b and into the sampling circuit 3 is inputted a brightness reference signal.

Further, another timing signal is inputted into the scanning circuit 2.

Figure 5:
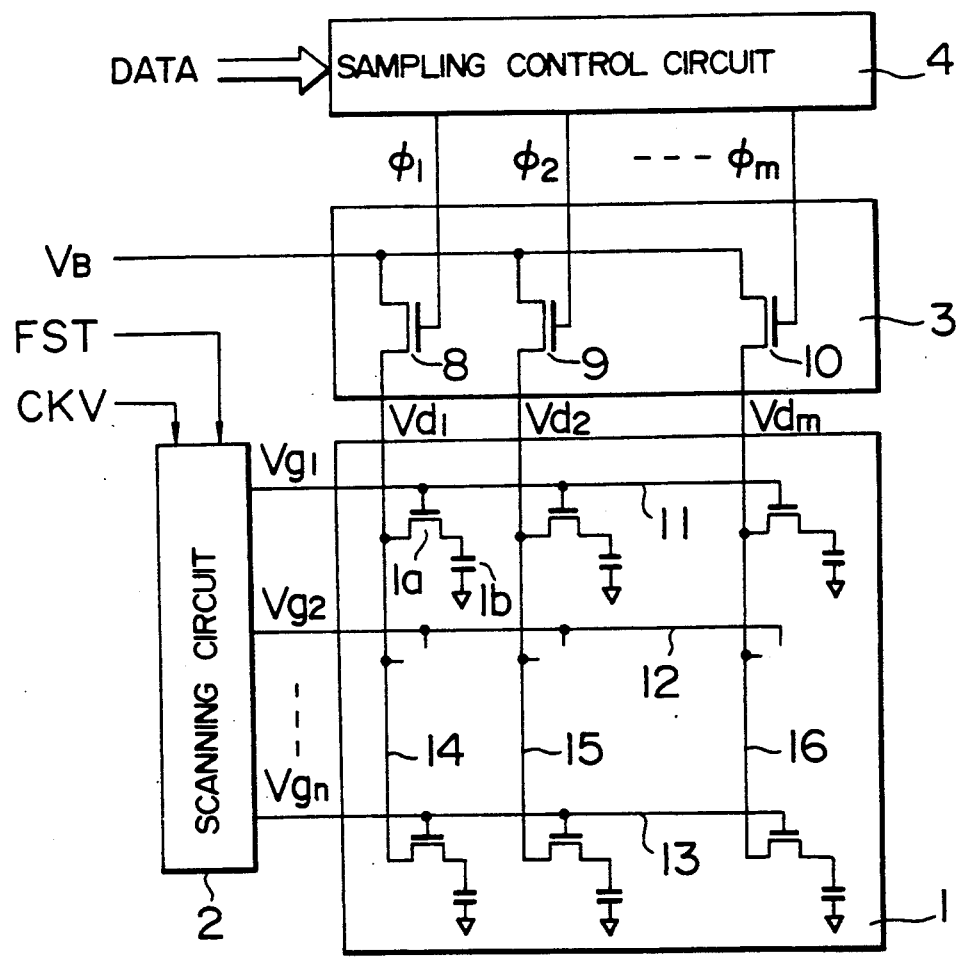
FIG. 5 is a block diagram illustrating the sampling circuit in FIG. 4 detail.

Now the operation of each of the parts will be explained below concretely. FIG. 5 shows an embodiment of the sampling circuit 3, when it is constructed by electronic switches 8 to 10. The electronic switches 8-10 may be constructed by TFTs or MOS transistors, but they are not restricted thereto.

Into the scanning circuit 2 are inputted an FST signal and a CKV signal as timing signals. Scanning signals $V_{g1}$ to $V_{gn}$ are outputted based on these signals.

On the other hand, into the sampling control circuit 4 is inputted a digital data signal DATA determining the display state of the liquid crystal, which is transformed into sampling signals $\phi_1$ to $\phi_m$.

The amplitude of the sampling signals $\phi_1$ to $\phi_m$ is determined by the logic level of the electronic switches constituting the sampling control circuit 4. For example, when the electronic switches are constituted by MOS transistors, it is 0 to 5 V. The amplitude of these sampling signals $\phi_1$ to $\phi_m$ is substantially equal to the amplitude (e.g. 0 to 5 V) of the digital data signal, which is the input signal to the sampling control circuit 4.

The sampling circuit 3 take in the brightness reference signal $V_B$ with the timing of the sampling signal $\phi_1$ to $\phi_m$ and outputs them as signal voltages $V_{d1}$ to $V_{dm}$.

The amplitude of the brightness reference signal $V_B$ is substantially equal to the amplitude of the voltage applied to the liquid crystal, which is −10V to 10V. It is usually greater than the amplitude of the sampling signals $\phi_1$ to $\phi_m$.

Figure 6:
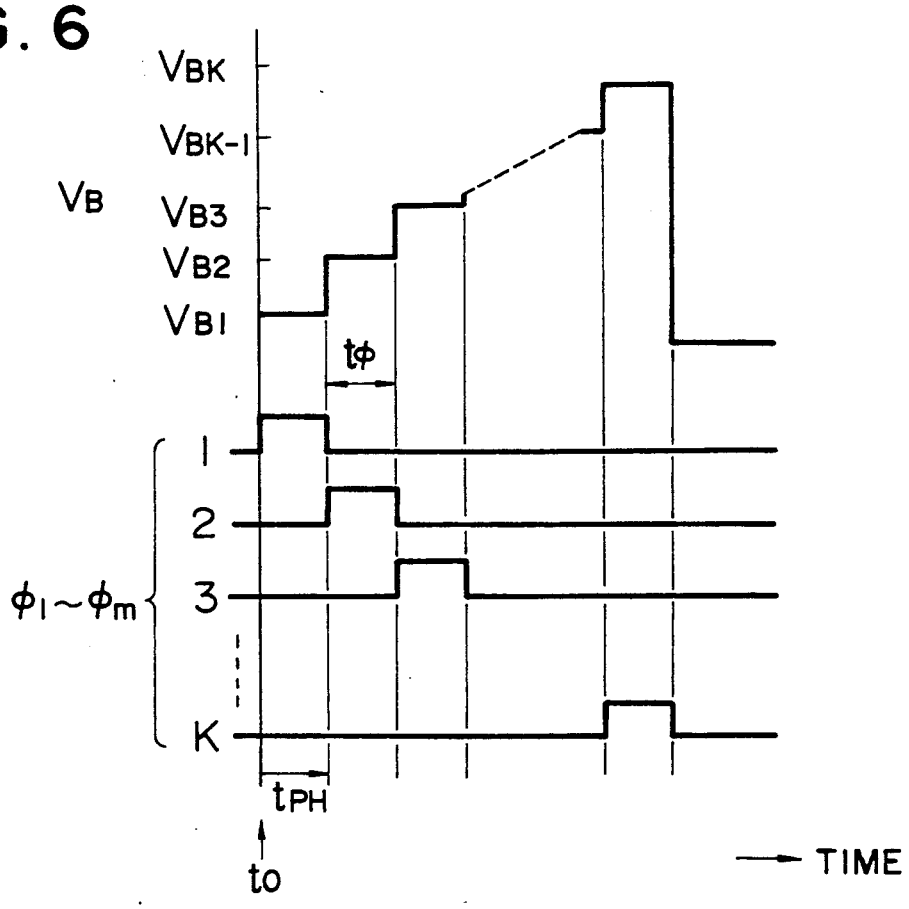
FIG. 6 to 12 are graphs showing waveforms of signals at various points in the circuit indicated in FIG. 5 in blocks.

FIG. 6 shows the relation between the brightness reference signal $V_B$ and the sampling signals $\phi_1$ to $\phi_m$ at this time.

The brightness reference signal is a signal, whose voltage level varies stepwise from $V_{B1}$ to $V_{BK}$. At this time the sampling signals $\phi_1$ to $\phi_m$ are pulse phase signals, whose pulse width is $t_\phi$ and each of which is delayed by $t_{PH}$ from the time $t_0$.

For example, for the sampling signals $\phi_1$ to $\phi_m$, at a timing indicated by 3 in FIG. 6, a voltage indicated by $V_{B3}$ in the brightness reference signal $V_B$ is selected and outputted as the signal voltage.

Figure 7:
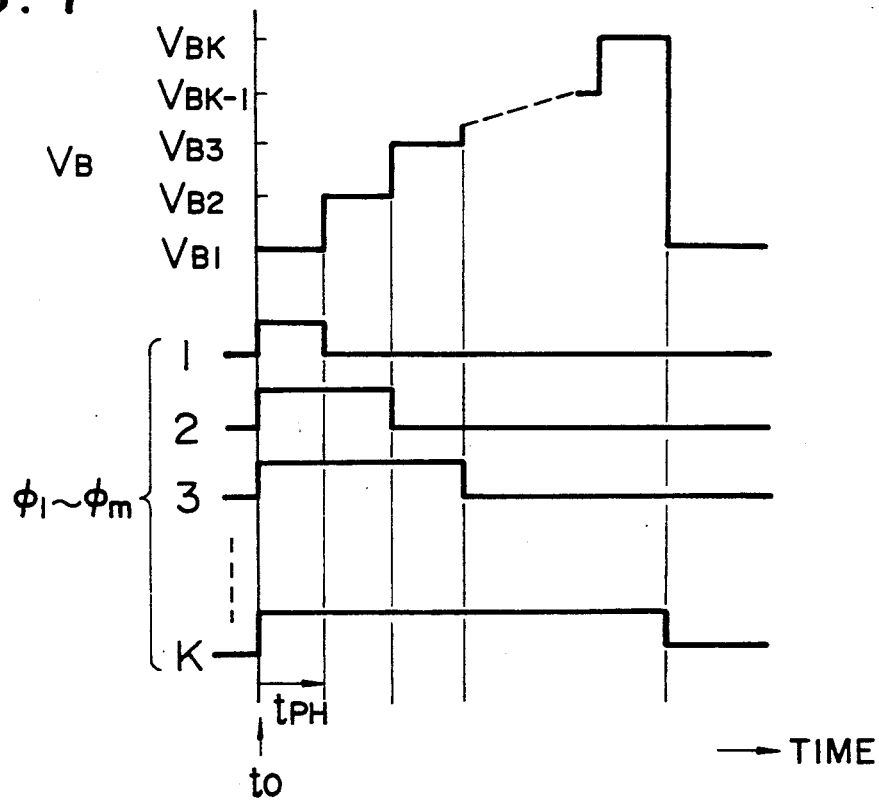

FIG. 7 shows another embodiment of the sampling signals $\phi_1$ to $\phi_m$. In this case the sampling signals $\phi_1$ to $\phi_m$ are pulse width signals, whose pulse width $t_{PH}$ varies. For example, at the timing indicated by 3 the voltage $V_{B3}$ is outputted as the signal voltage similarly to that indicated in FIG. 6.

The sampling signals $\phi_1$ to $\phi_m$ indicated in FIGS. 6 and 7 changes the pulse phase as indicated in FIG. 6 or the pulse width as indicated in FIG. 7, responding to the data signal DATA inputted in the sampling control circuit 4.

Figure 8:
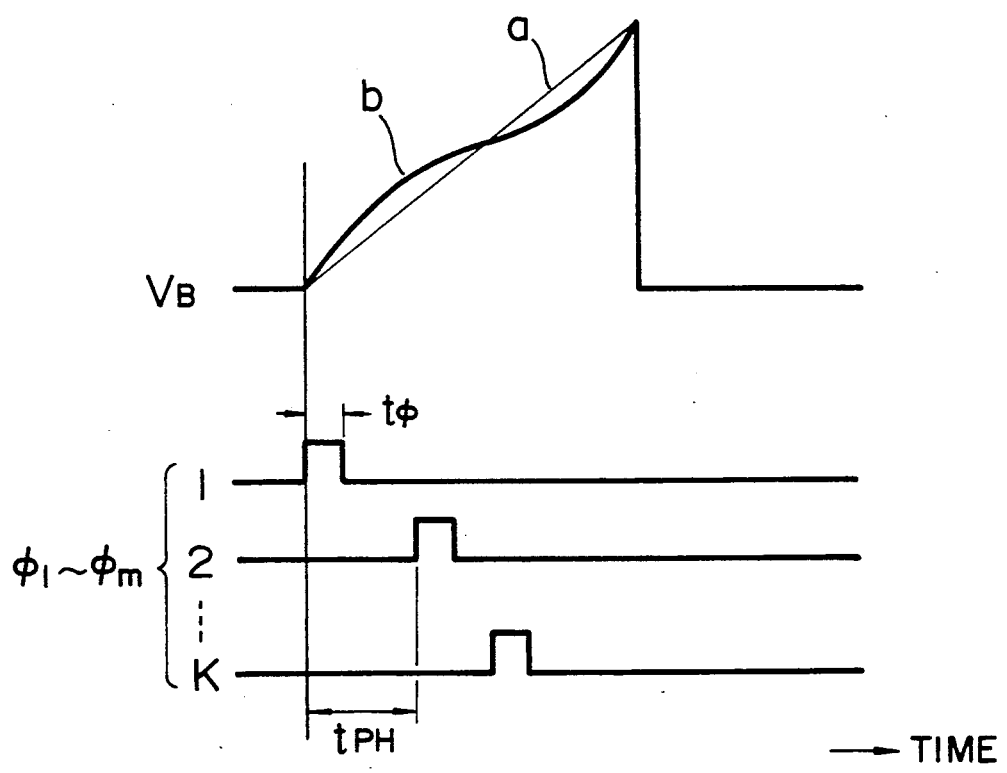

The brightness reference signal $V_B$ is not restricted to the signals indicated in FIGS. 6 and 7, but it may vary e.g. linearly (b) (a) or non-linearly, as indicated in FIG. 8.

Further, the pulse phase times $t_{PH}$ of the sampling signals $\phi_1$ to $\phi_m$ may be distributed not necessarily with a constant interval. This is true also for the pulse width.

Figure 19:
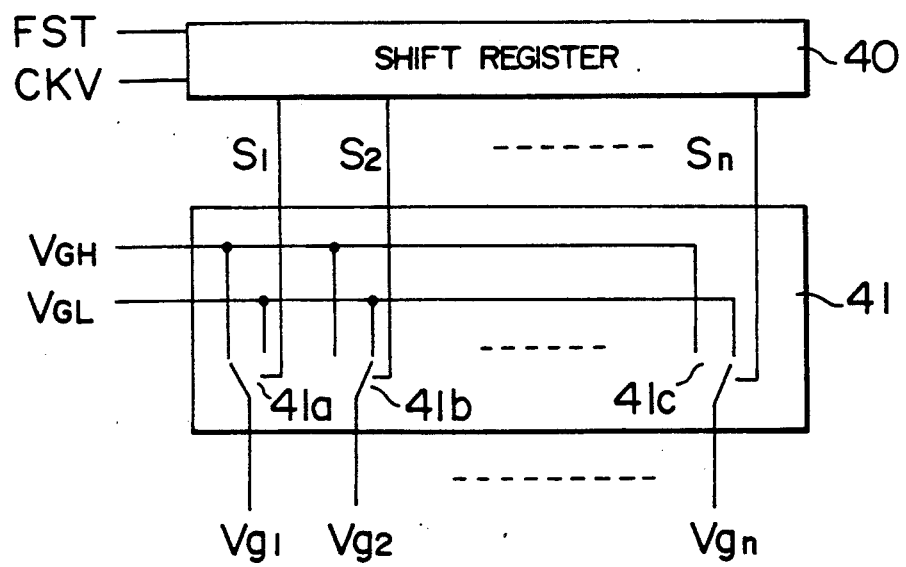
FIG. 19 is a block diagram illustrating still another embodiment for the scanning circuit indicated in FIG. 4.

FIG. 19 shows a concrete example of the scanning circuit 2 indicated in FIG. 4. The scanning circuit consists of a shift register 40 and an output circuit 41. The shift register 40 generates successively scanning pulse signals $S_1$ to $S_m$.

Figure 20:
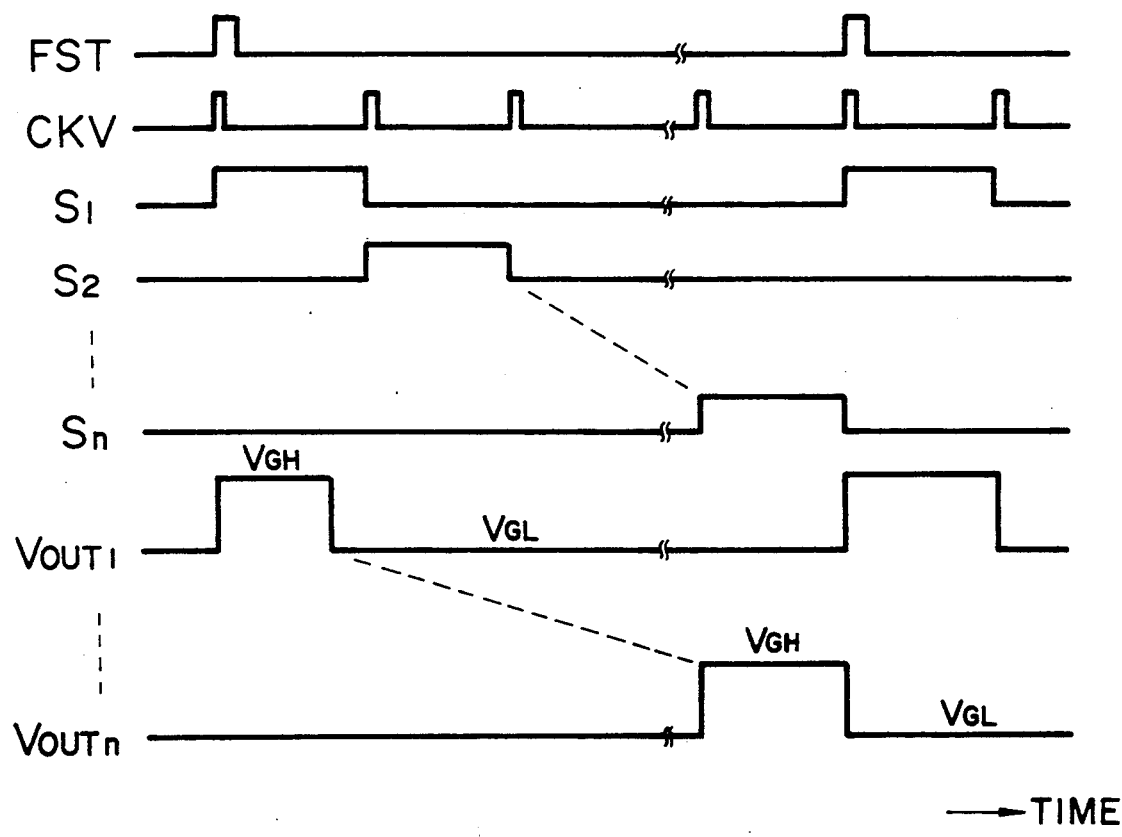
FIG. 20 indicates graphs showing waveforms of signals for explaining the operation of the circuit indicated in FIG. 19 in blocks.

On the other hand, the output circuit 41 consisting of one-out-of-two multiplexers 41a to 41c selects either one of voltages $V_{GH}$ and $V_{GL}$, responding to the scanning pulse signals $S_1$ to $S_n$. The TFTs 1a are turned on by the $V_{GH}$ stated above and turned-off by the $V_{GL}$. FIG. 20 indicates the timing chart showing the operation of this scanning circuit.

The scanning circuit may generate a voltage capable of turning-on the TFTs 1a for every line and it is not restricted to FIGS. 19 and 20.

Figure 21:
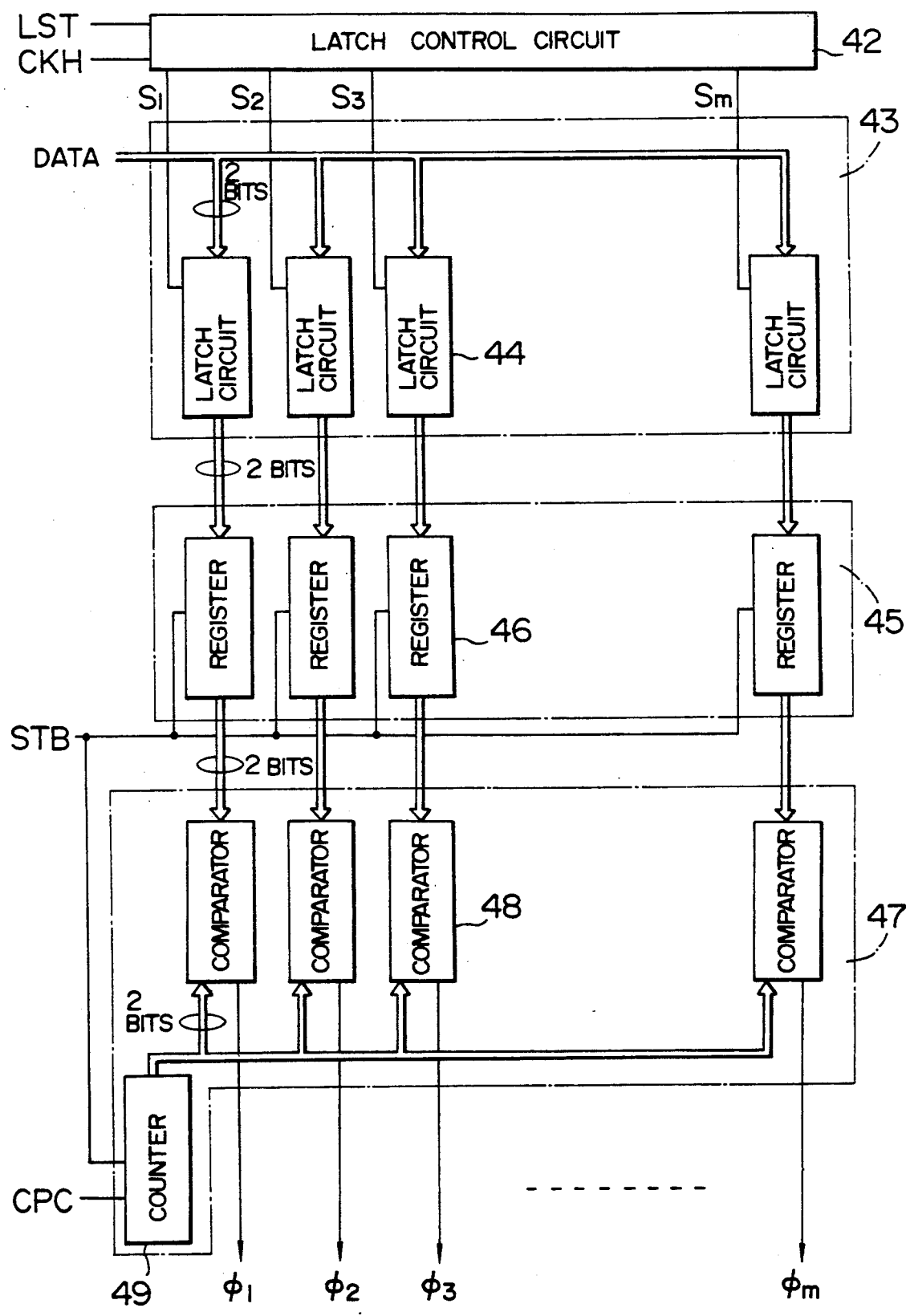
FIG. 21 is a block diagram illustrating still another embodiment of the sampling control circuit indicated in FIG. 4.

FIG. 21 shows an embodiment of the sampling control circuit 4 acting as digital-time function transforming means indicated in FIG. 4. The sampling control circuit 4 generates the sampling signals $\phi_1$ to $\phi_m$, which are time function signals for sampling the brightness reference signal $V_B$, whose voltage varies with the lapse of time, as explained, referring to FIG. 5. Consequently, the sampling control circuit 4 outputs the pulse phase or the pulse width corresponding to the gray scale information of the digital data signal DATA.

In another embodiment of the sampling control circuit indicated in FIG. 21, the pulse phase can vary, depending on the gray scale of the data signal DATA, and the number of gray scale is 4.

Figure 22:
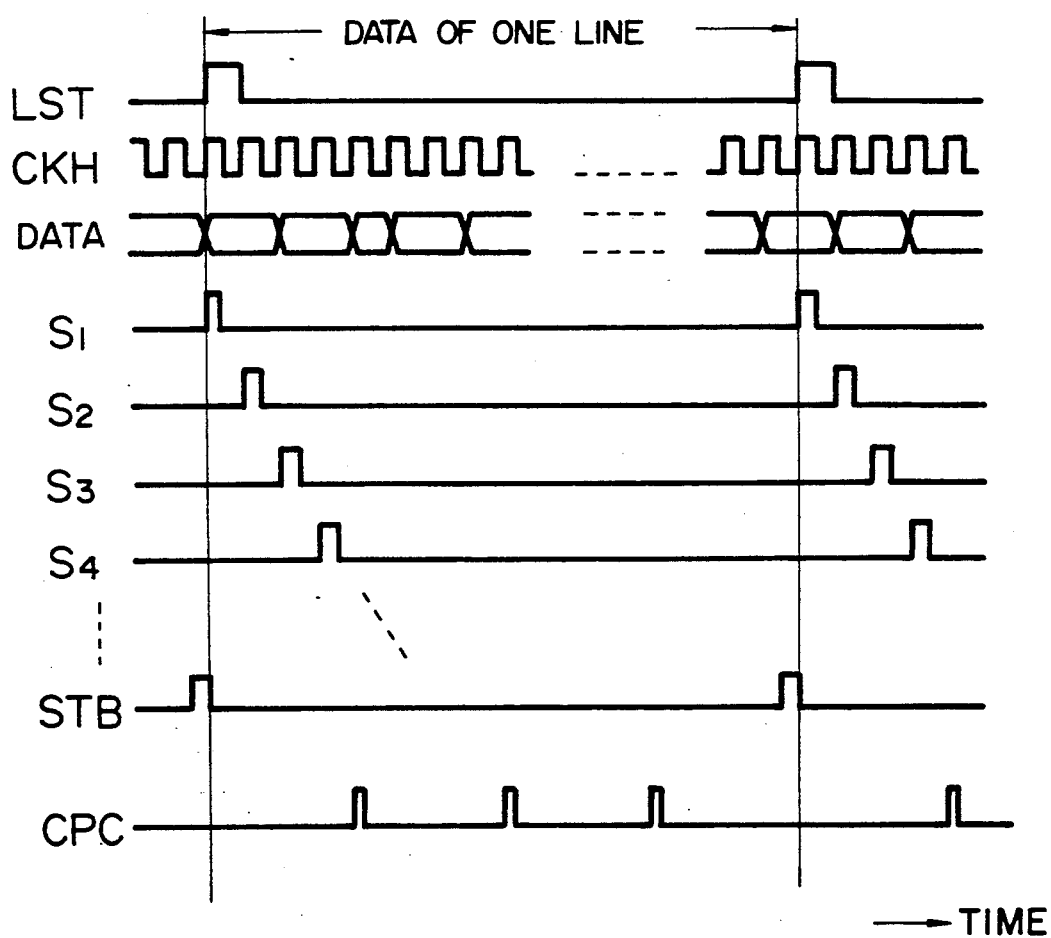
FIGS. 22 and 23 are graphs showing waveforms of signals at various points in the circuit indicated in FIG. 21 in blocks.
Figure 23:
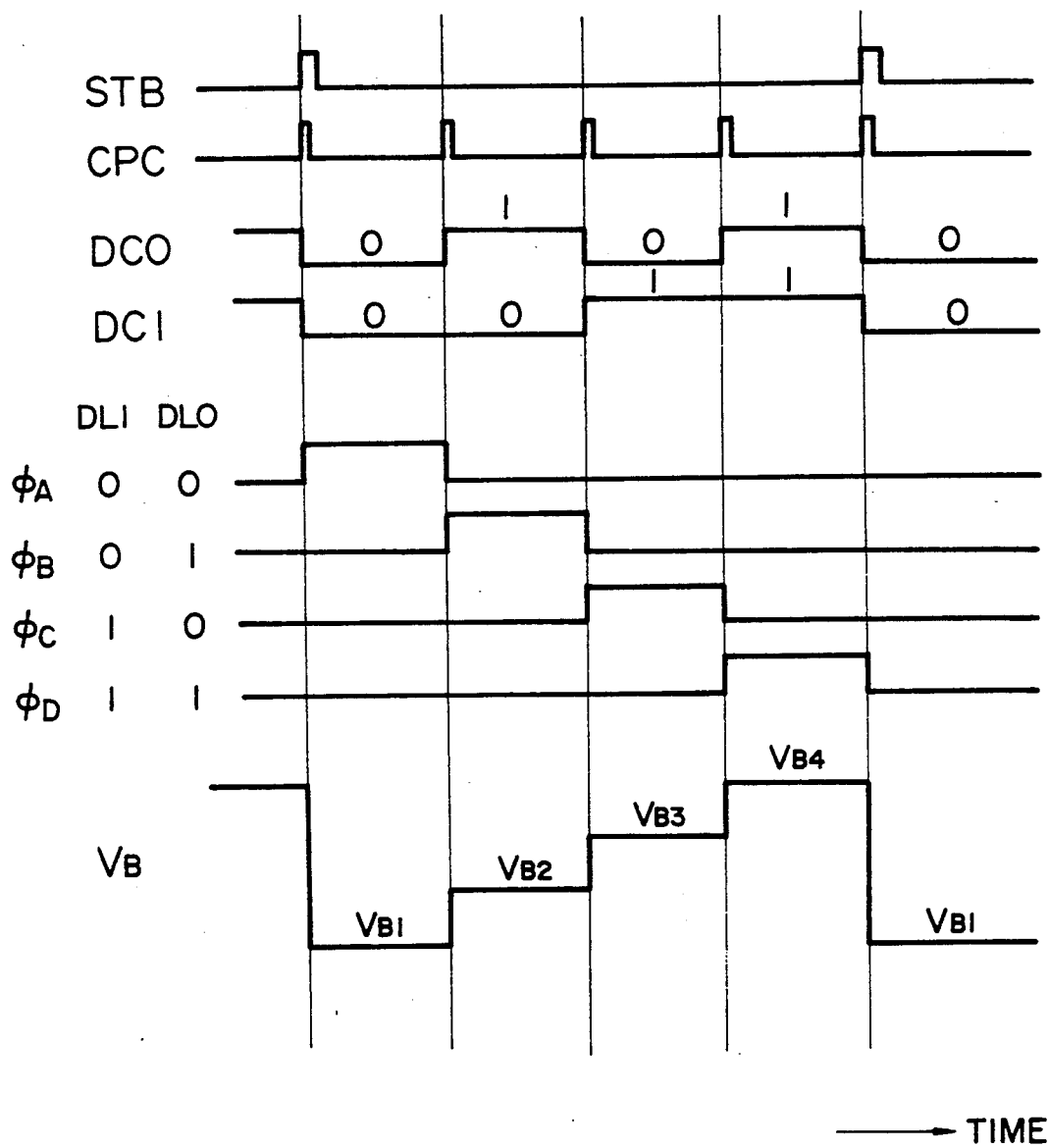

The operation of various parts will be explained below, referring to the timing charts indicated in FIGS. 22 and 23. The data signal DATA is a digital signal including the gray scale information, which is taken in each of latch circuits 44 with the timing of the latch signals $S_1$ to $S_m$ coming from a latch control circuit 42. Further, when the data signal for one line is taken in the group of latch circuits 43, then a group of registers 45 takes the data signal for one line all at once with the timing of a strobe signal STB.

On the other hand reference numeral 49 represents a binary counter dividing the frequency by 4, which is set by the strobe signal STB and counts-up clock signals CPC. Consequently the output signals DC0 (least significant bit) and DC1 (most significant bit) vary from DC0=0 and DC1 32 0 to DC0=1 and DC1=1.

A comparator compares the output signal DL0 (least significant bit) with the DL1 (most significant bit) of the register as well as the output DC0 with DC1 of the counter 49 and when they are in accordance with each other, a sampling signal $\phi$ is outputted.

At this time the sampling signal $\phi$ is either one of $\phi_A$ to $\phi_D$ having different phases, depending on the content of the output signals DC0 and DC1 of the register 46.

On the other hand the brightness reference signal $V_B$ is obtained by A/D (analogue/digital) transforming the output signals DC0 and DC1 of the counter 49. In this embodiment $v_B$ has four levels from $V_{B1}$ to $V_{B4}$.

For example, in the case where the output signals 20 of the register 46 are DC0=0 and DC1=1, the sampling signal is $\phi_C$. As a result, the output voltage $V_d$ of the sampling circuit 3 indicated in FIG. 4 is $V_{B3}$. In this way, voltages of four different levels are outputted by the sampling circuit 3, depending on the state of the output signal of the register 46, i.e. the content of the data signal DATA.

Although this embodiment has been explained for the case where the display device is driven with a 4 gray scale, it is possible to vary the number of the gray scale by varying the number of bits.

Further, as the data signal DATA indicated in FIG. 21, data (2×K bits) for a plurality (=K) of pixels may be inputted. In this way, the speed of the operation of the sampling control circuit 42 can be lowered.

Figure 27:
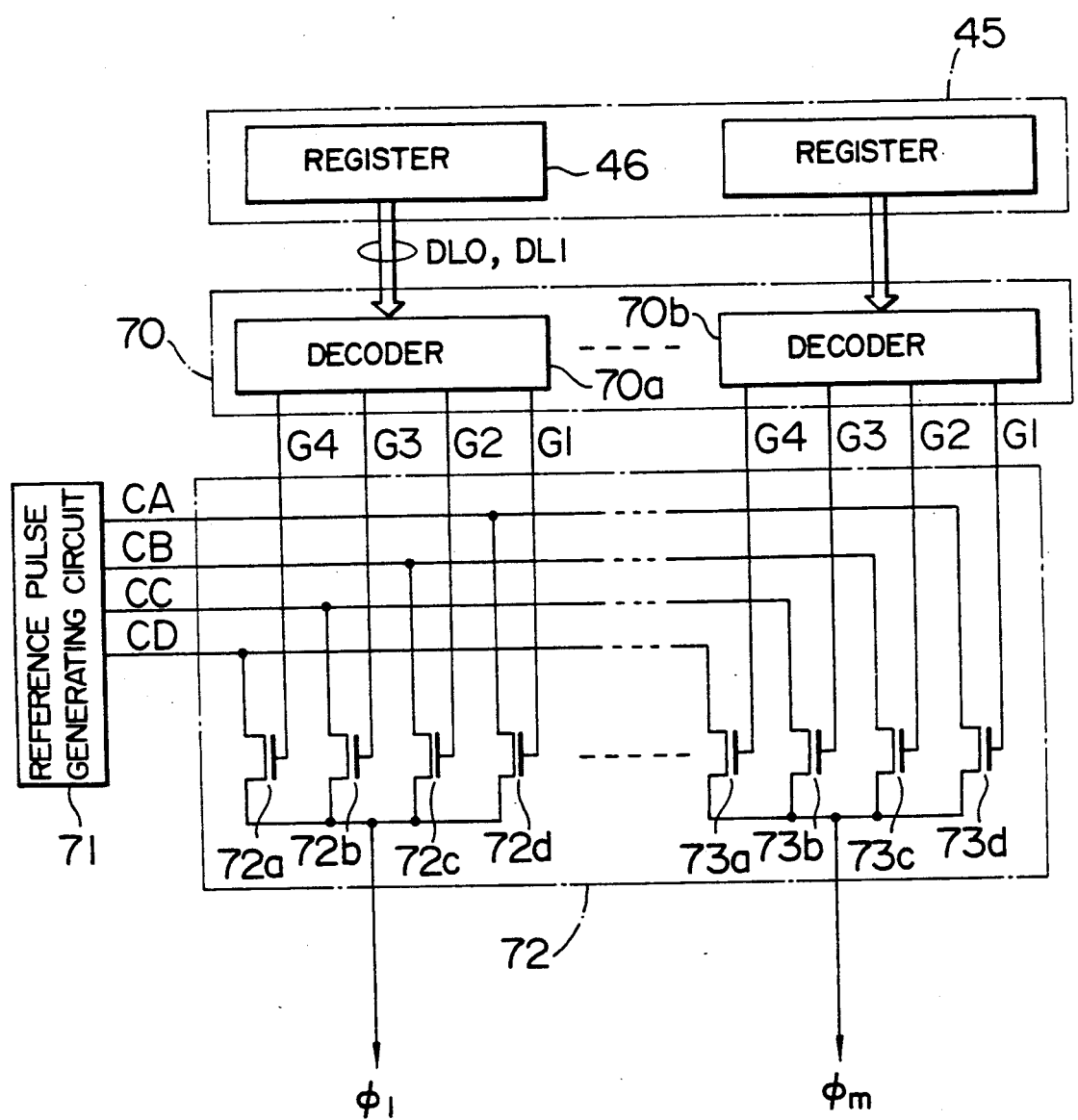
FIG. 27 is a block diagram illustrating still another embodiment of the sampling control circuit indicated in FIG. 4.

FIG. 27 shows another embodiment of the sampling control circuit 4. The registers 46 and the group of registers 45 are identical to those indicated in FIG. 21 and the number of the gray scale is set to 4.

The circuit consists of decoders 70a, 70b, a reference pulse generating circuit 71, and electronic switches 72a to 73d. The operation of these parts will be explained, referring to FIGS. 28, 29 and 30.

Figure 28:
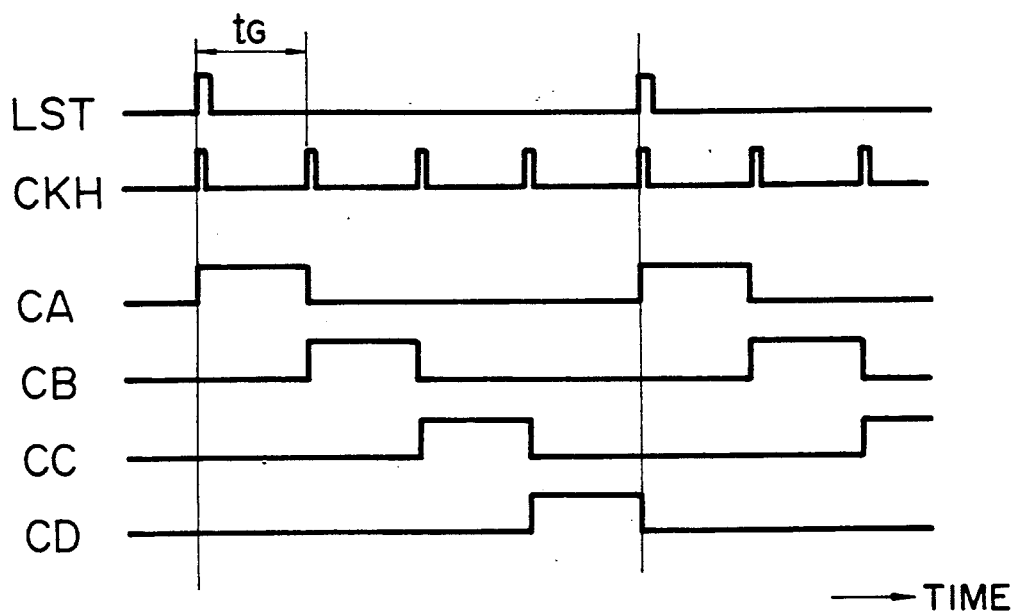
FIGS. 28 to 30 are graphs showing waveforms of signals at various points in the circuit of the embodiment indicated in FIG. 27.
Figure 29:
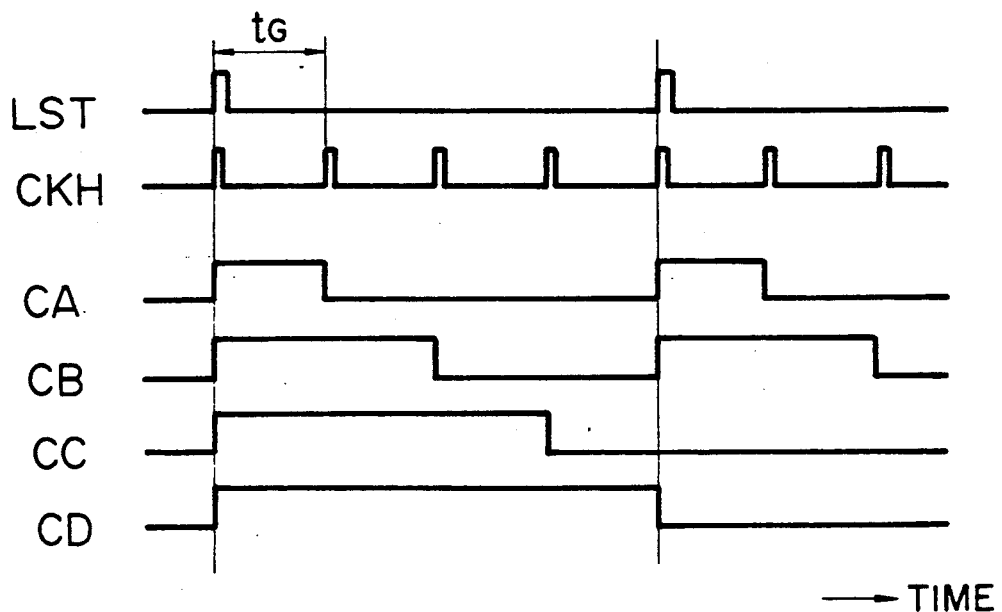

The reference pulse generating circuit 71 generates pulses CA to CD having different pulse phases, as indicated in FIG. 28, or having different pulse widths, as indicated in FIG. 29.

Figure 30:
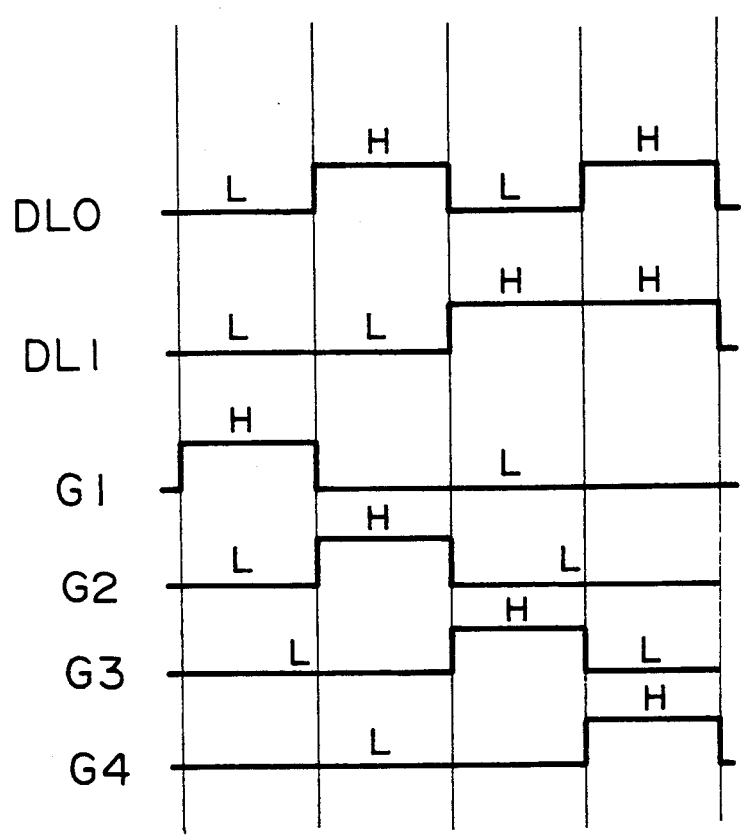

On the other hand, as indicated in FIG. 30, when the data signals (DL0, DL1) of 2 bits from the register 46 are inputted in a decoder 70a, one of the signals G1 to G4 becomes H, depending on the content thereof.

Further, when the output signals G1 to G4 of the decoder 70a are turned to H, the electronic switches 72a to 73d are turned to the ON state, respectively.

Consequently, one of the signals CA to CD indicated in FIGS. 28 and 29 is selected depending on the content of the decoder signals DL0 and DL1 of the decoders 70a, 70b.

For example, in the case of the timing chart indicated in FIG. 29, for DL0=L, and DL1=L CA is selected, which serves as the sampling signal. For DL0=H and DL1=L CB is selected; for DL0=L, and DL1=H, CC is selected; and for DL0=H and DL1=H CD is selected.

Figure 31:
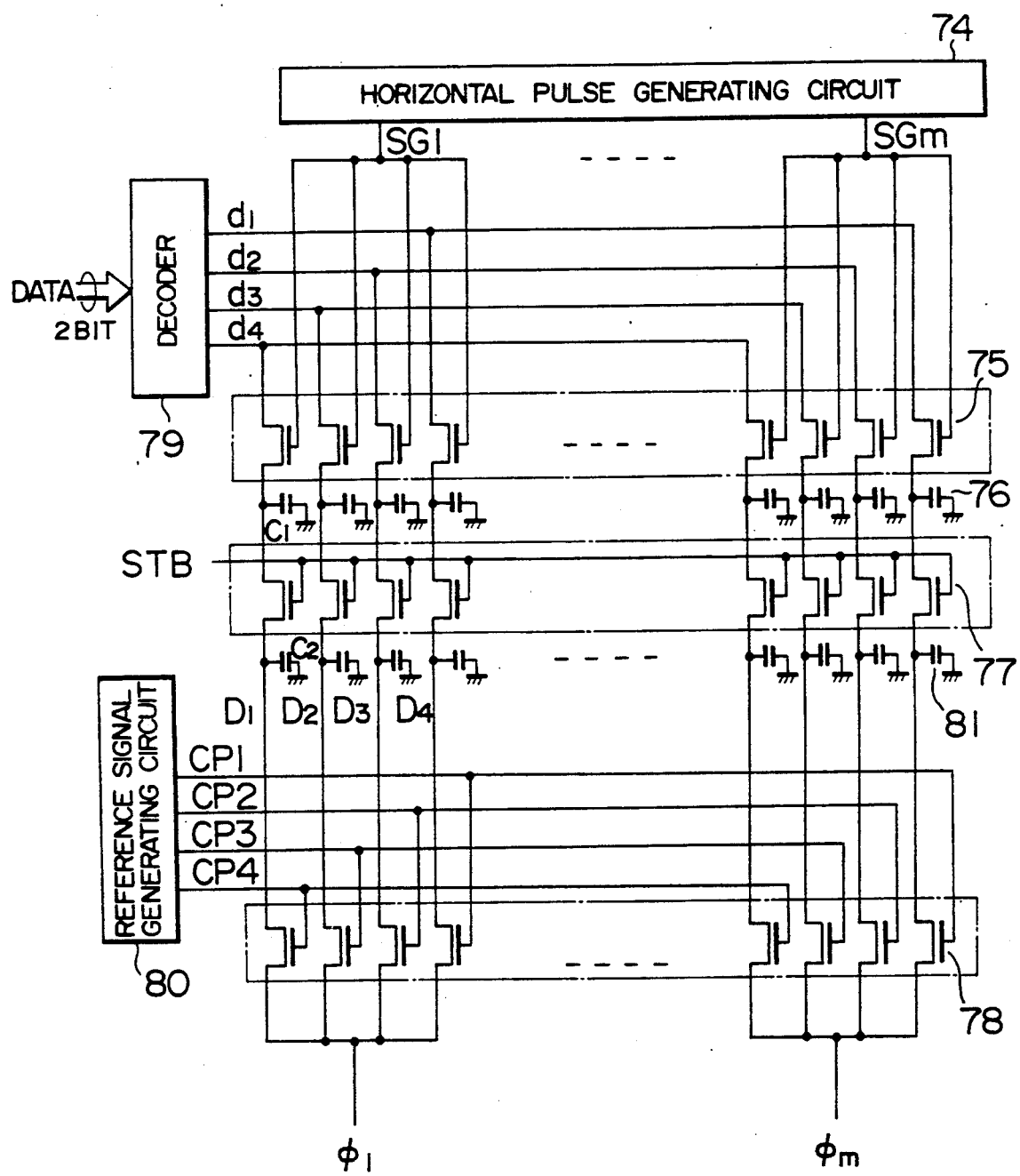
FIG. 31 is a block diagram illustrating still another embodiment of the sampling control circuit.

FIG. 31 shows still another embodiment of the sampling control circuit, where the number of the gray scale is 4.

The decoder 79 decodes the data signal DATA of 2 bits including gray scale information to transform it into a signal of 4 bits d1 to d4. Signals thus obtained are inputted in capacitors 76 for every block successively through a data sample circuit 75 with the timing of output signals $SG_1$ to $S_{Gm}$ of a horizontal pulse generating circuit 74.

At this time, when signals of one line are inputted in the capacitors 76, they are inputted in capacitors 81 with the timing of the strobe pulse STB.

Figure 32:
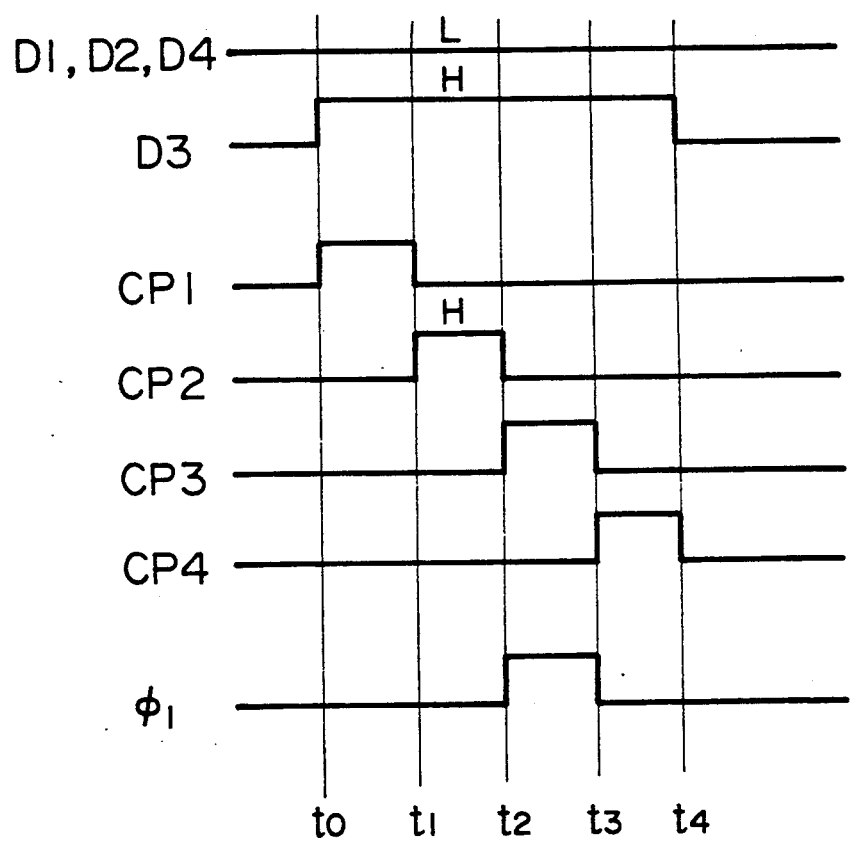
FIG. 32 is a graph indicating waveforms of various signals generated by the reference signal generating circuit 80 indicated in FIG. 31.

On the other hand, a reference signal generating circuit 80 generates signals CP1 to CP4, as indicated in FIG. 32. As a result, a select circuit 78 outputs AND (product) signals of signals D1 to D4 accumulated in the capacitors 81 and the signals CP1 to CP4. For example, when the signal D3 is H, the signal $\phi_1$ is H between $t_2$ and $t_3$.

In this way the phase of the signal $\phi_1$ varies, depending on the state of the signals D1 to D4.

Figure 9:
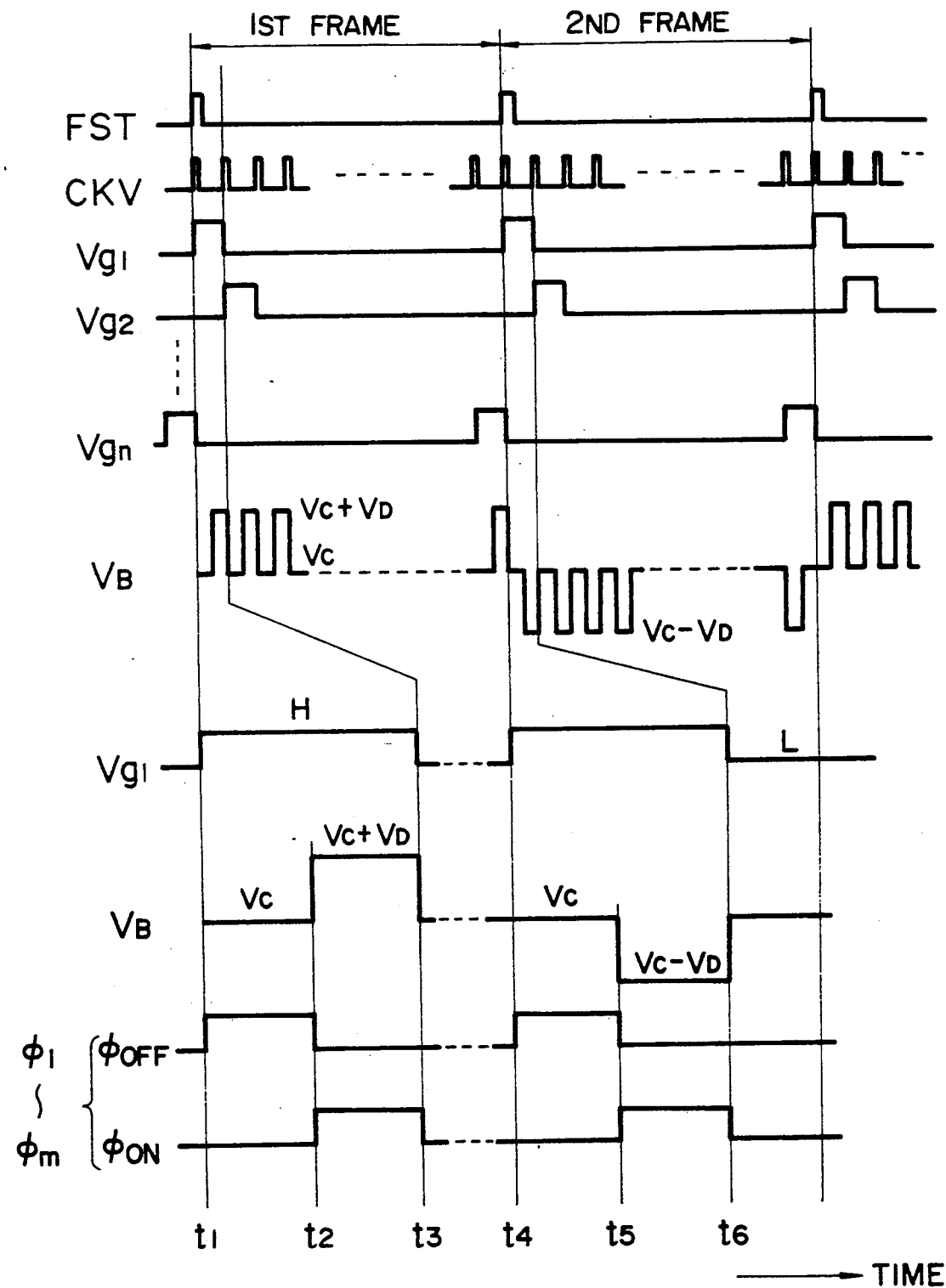

FIG. 9 shows the timing of the operation of the whole device. Scanning signals $V_{g1}$ to $V_{gn}$ are signals which turn on the TFTs are after another and which are generated with the timing of the FST and CKV signals.

The brightness reference signal $v_B$ is indicated for the case where the number of gray scale is 2, i.e. the liquid crystal is turned either to the ON state or to the OFF state. Consequently $V_B$ has 3 levels of $V_C$, $V_C+V_D$ and $V_C-V_D$. $V_C+V_D$ and $V_C-V_D$ are obtained by using $V_C$ as the reference and varying only $V_D$. This is because the polarity of the voltage applied to the liquid crystal is inverted for every frame in order to AC drive the liquid crystal.

Here, in the case where the liquid crystal should be switched off, the sampling signals $\phi_1$ to $\phi_m$ are changed to a signal $\phi_{off}$ and inversely, in the case where it should be switched on, they are changed to a signal $\phi_{on}$.

Figure 10:
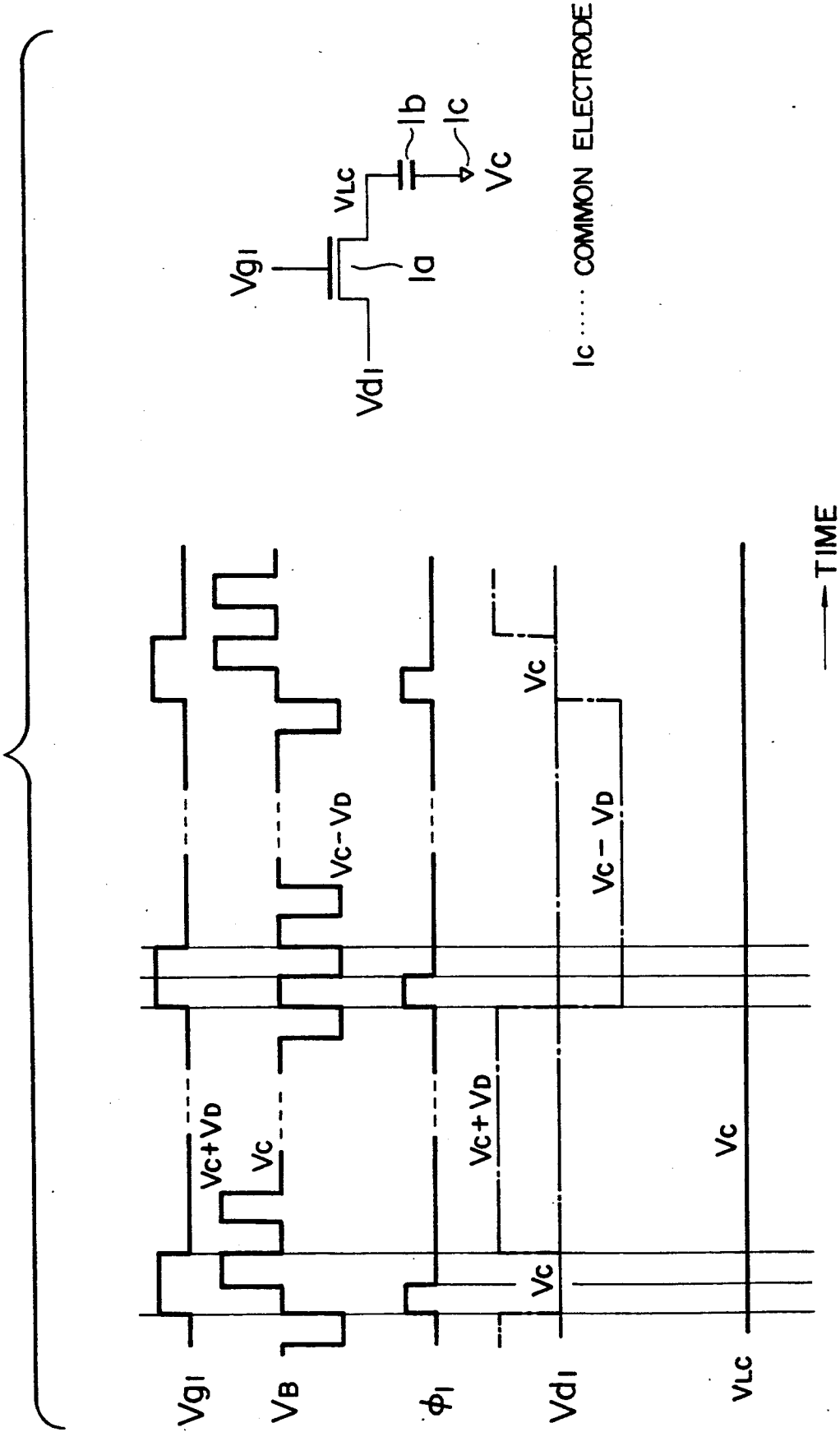

FIG. 10 shows the timing, in the case where the liquid crystal is turned to the OFF state, together with the voltage $v_{LC}$ applied to the liquid crystal 1b. In this example, as shown at the right lower side in FIG. 10, the object is the TFT located at the left upper side of the TFT liquid crystal panel 1 indicated in FIG. 5.

The voltage $v_{LC}$ applied to the liquid crystal becomes equal to $V_C$ depending on the timing of the sampling signal $\phi_1$ and the brightness reference signal $v_B$. On the other hand, when the potential of the common electrode 1C of the TFT liquid crystal is set to $V_C$, the voltage applied to the two terminals of the liquid crystal 1b is 0 and therefore the liquid crystal is turned to the OFF state.

Figure 11:
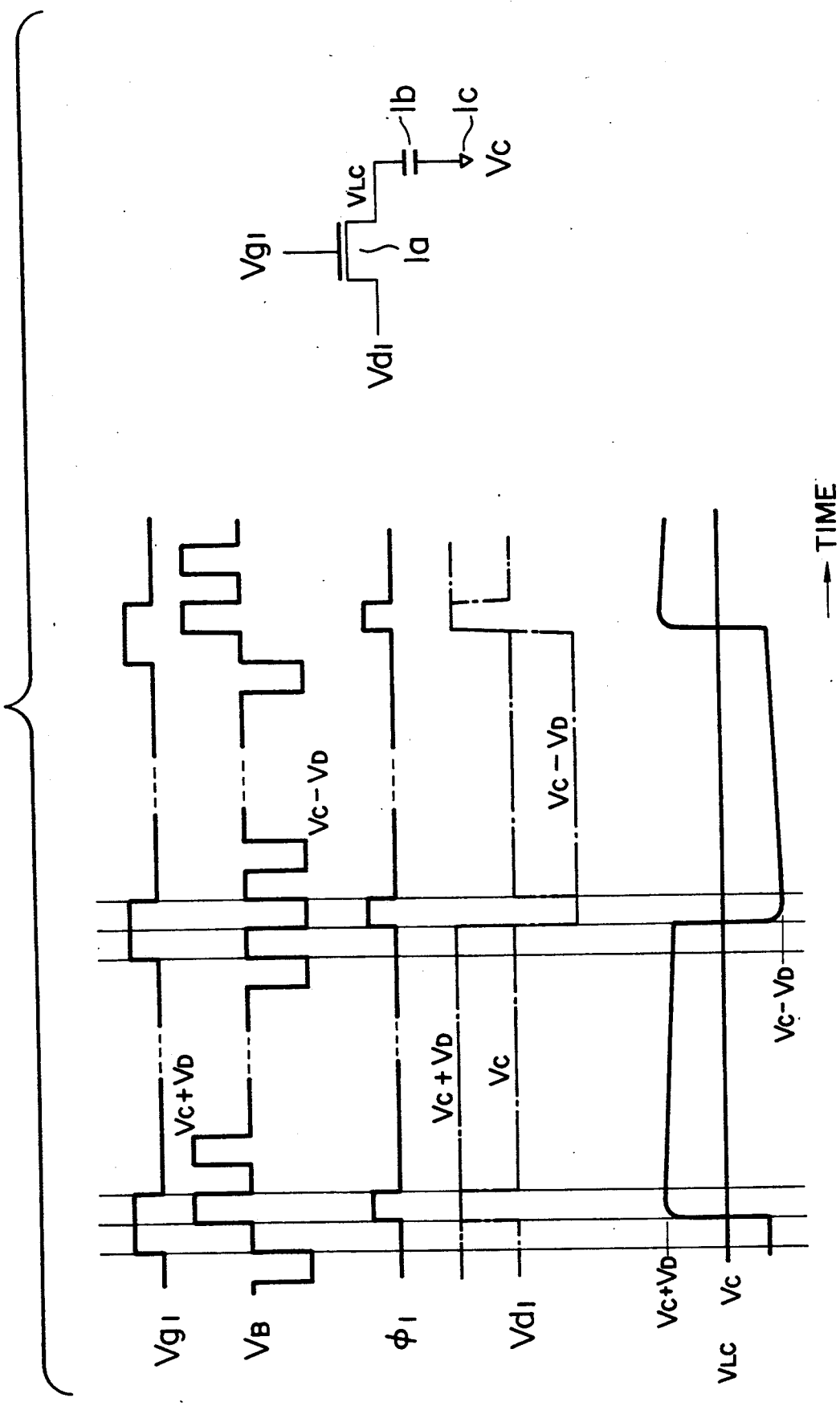

FIG. 11 shows the timing in the case where the liquid crystal is turned to the ON state. A voltage $V_C+V_D$ or $V_C-V_D$ is applied to the liquid crystal 1b by delaying the phase of the sampling signal $\phi_1$. The liquid crystal is turned to the ON state by the potential difference between this voltage and the potential $V_C$ of the common electrode 1c.

Figure 12:
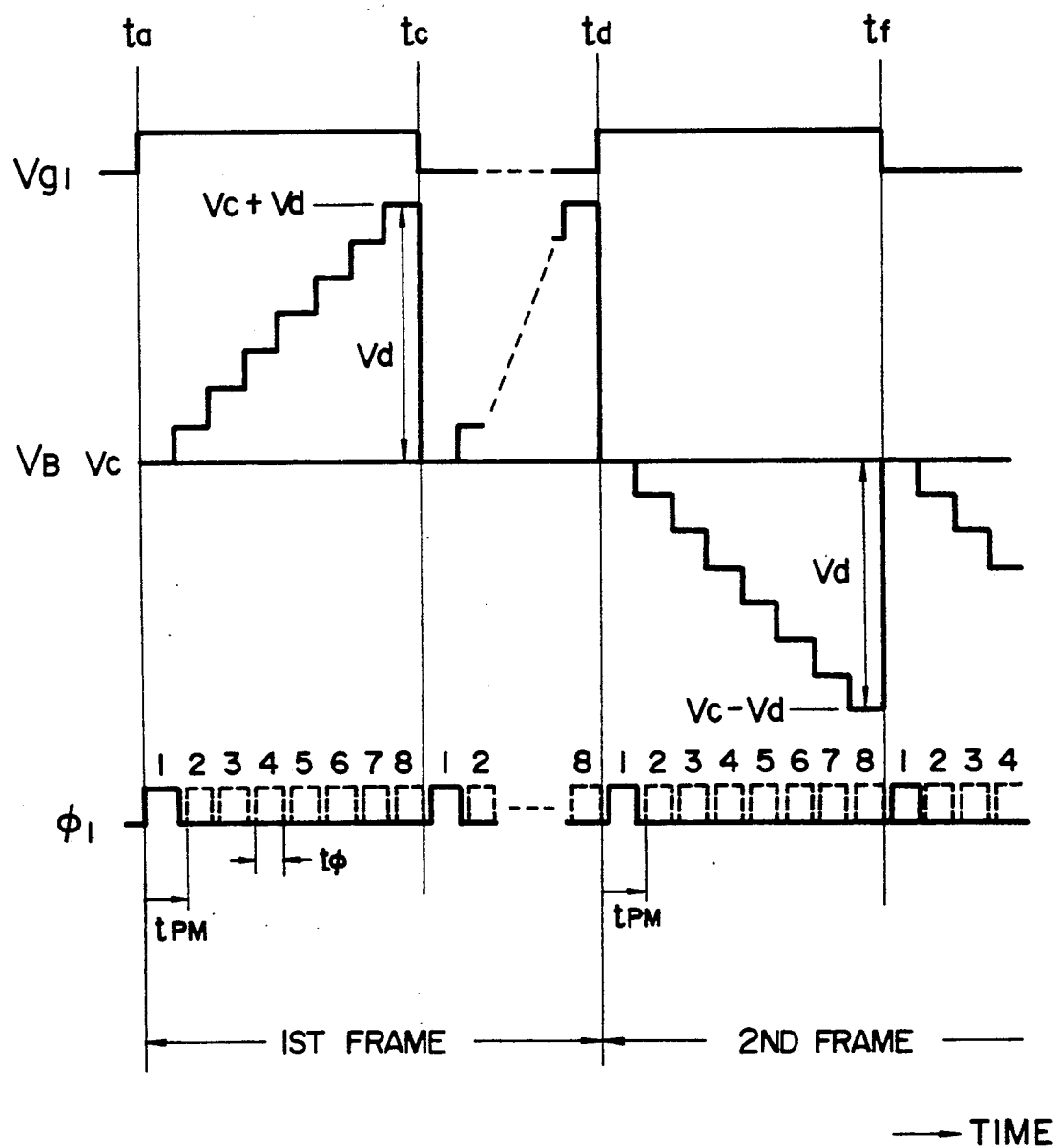

FIG. 12 shows the timing, in the case where the liquid crystal is controlled with 8 gray scales. At this time the brightness reference signal $V_B$ is divided into 8 levels and the polarity of the applied voltage is inverted for every frame.

One of the 8 levels, into which the brightness reference signal $V_B$ is divided, is selected by controlling the phase time $t_{PH}$ of the sampling signal $\phi_1$ to be from 1 to 8 to obtain the signal voltage.

Figure 13:
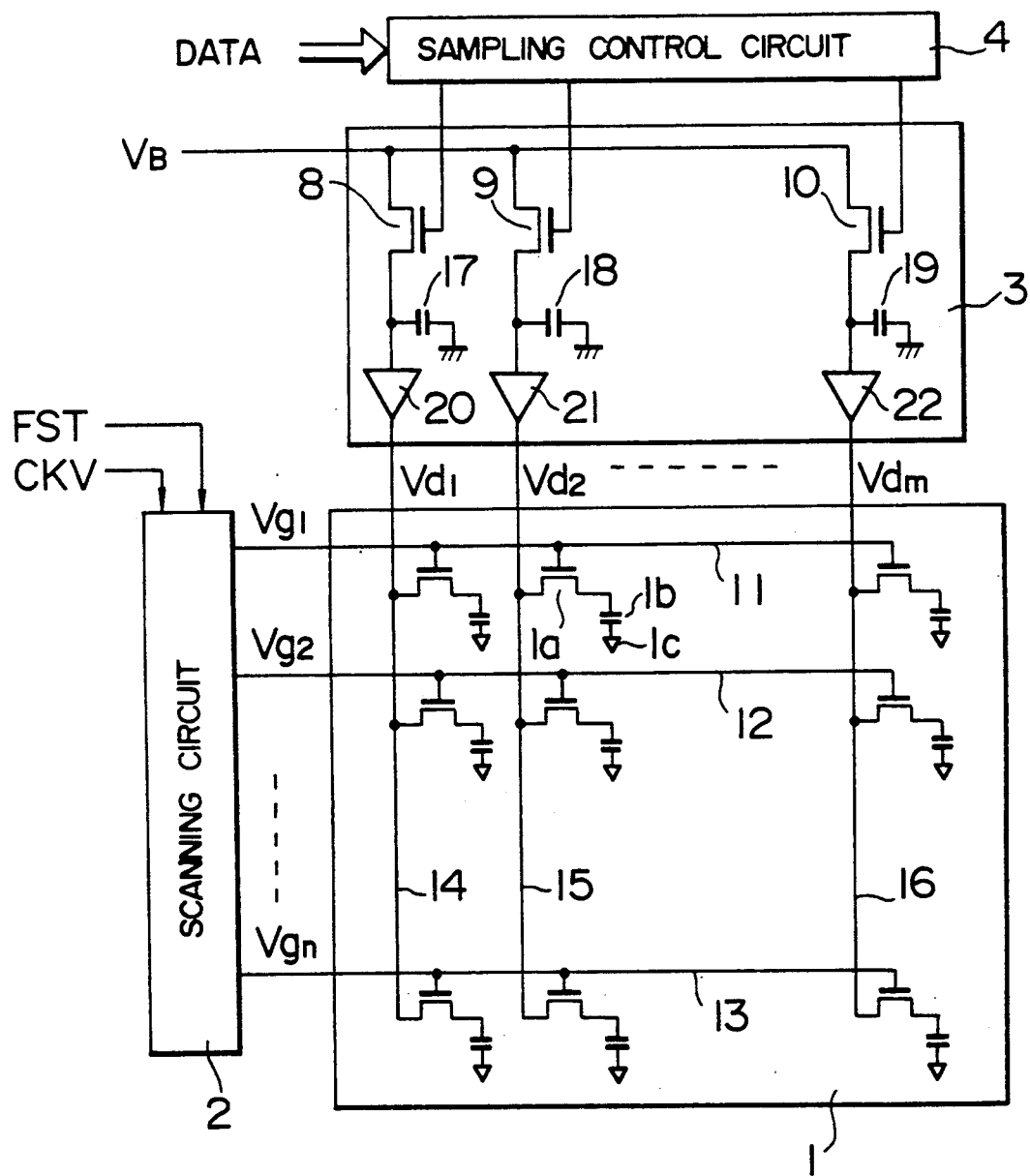
FIG. 13 shows another embodiment for the sampling indicates in FIG. 4.

FIG. 13 illustrates another embodiment of the sampling circuit 3, which consists of electronic switches 8 to 10, capacitors 17 to 19 and buffer circuits 20 to 22.

Figure 14:
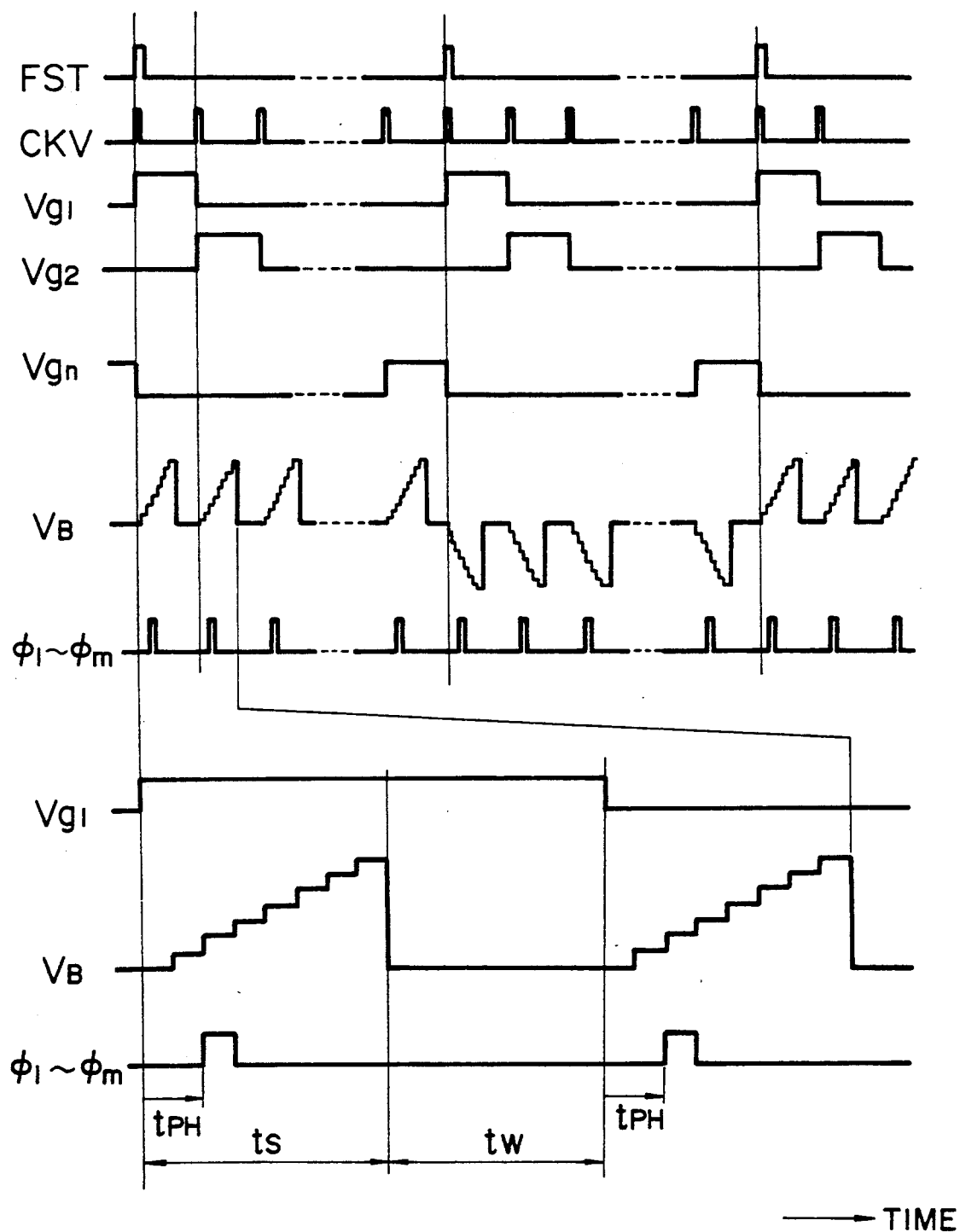
FIG. 14 indicates graphs showing waveforms of signals at various points in the circuit indicated in FIG. 13 in blocks.

FIG. 14 shows the timing chart in this case. Here, explanation will be made by taking the case, where the liquid crystal is controlled with 8 gray scales, as an example. The brightness reference signal taken-in with the timing of the sampling signals $\phi_1$ to $\phi_m$ is held in the capacitors 17 to 19 and supplied to the signal lines 14 to 16 through the buffer circuits 20 to 22, respectively.

The brightness reference signals $V_B$ is sampled during a period of time of $t_s$ and written in the liquid crystal 1b during a period of time of $t_w$.

Figure 15:
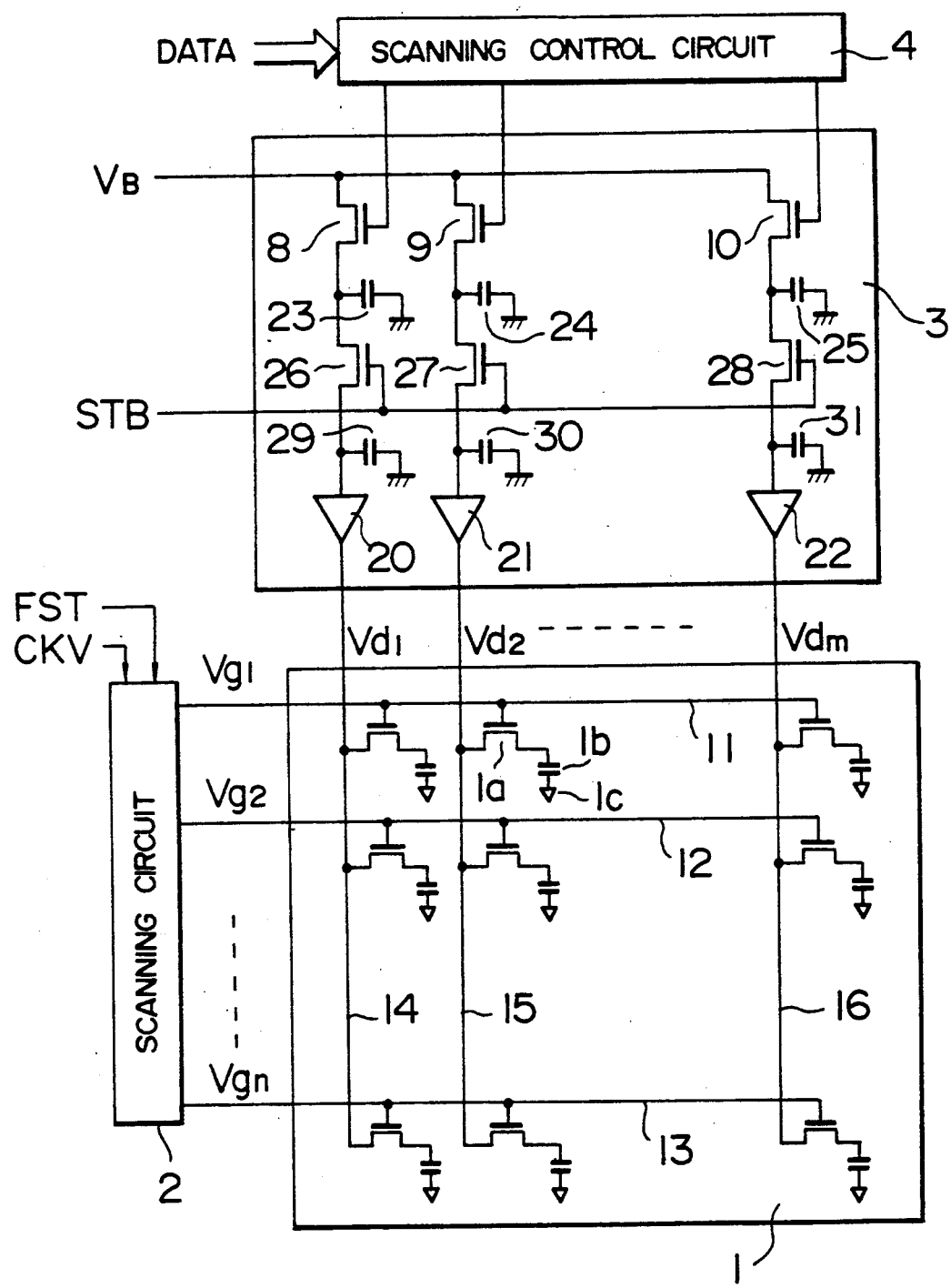
FIG. 15 shows still another embodiment for the sampling circuit indicated in FIG. 4.

FIG. 15 illustrates still another embodiment. The sampling circuit 3 consists of electronic switches 8 to 10, capacitors 23 to 25, electronic switches 26 to 28 and buffer circuits 20 to 22.

Figure 16:
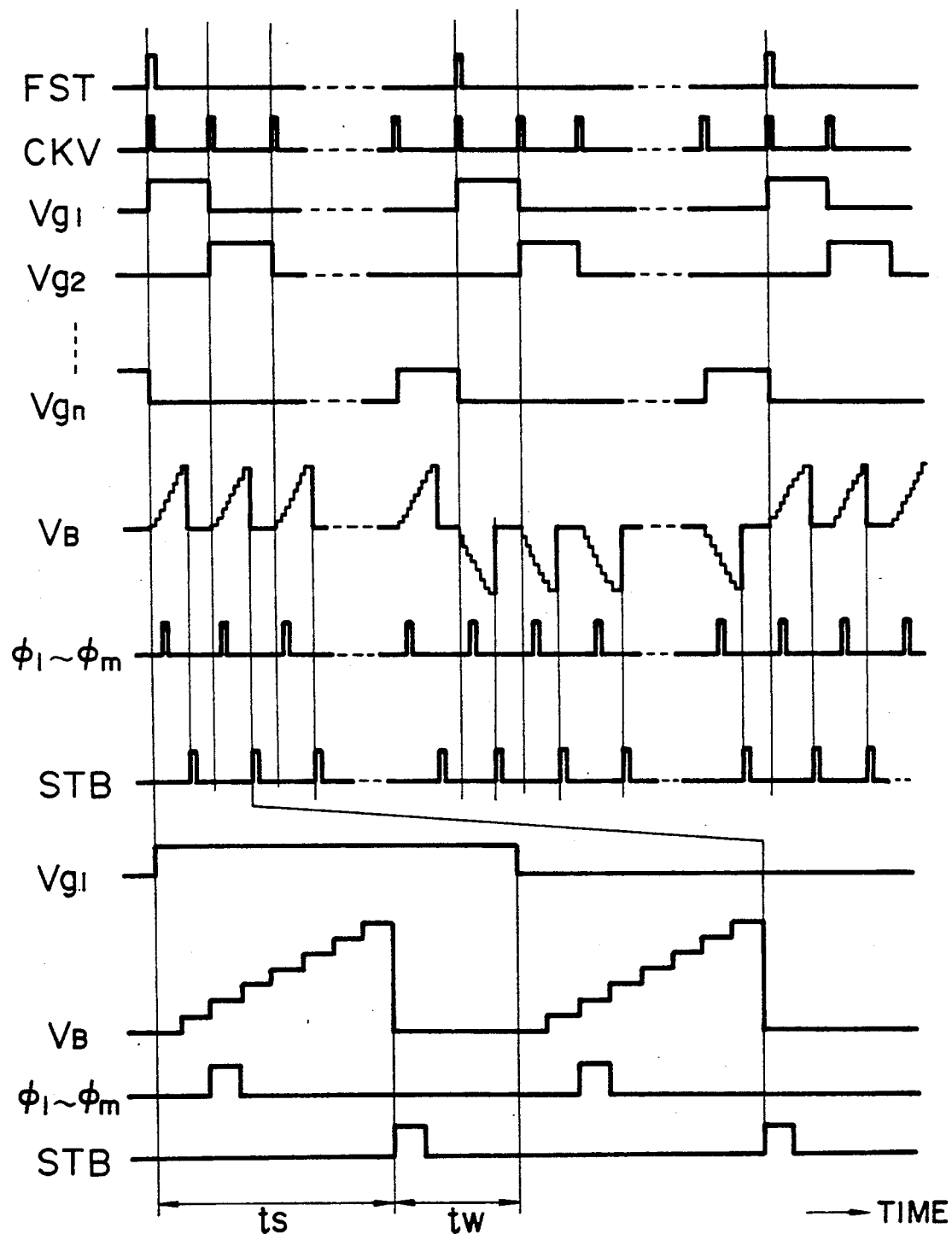
FIGS. 16 and 17 are graphs showing waveforms of signals at various points in the circuit indicated in FIG. 15 in blocks.

FIG. 16 shows the timing charts in this case. Here, explanation will be made by taking the case, where the liquid crystal is controlled with 8 gray scales, as an example. The brightness reference signal take in with the timing of the sampling signals $\phi_1$ to $\phi_m$ is held in the capacitors 29 to 31.

In this embodiment the sampling of the brightness reference signal $V_B$ is terminated in a period of time $t_S$, but the signal voltages $V_{d1}$ to $V_{dm}$ vary at the same time independently of the timing of the sampling.

Figure 17:
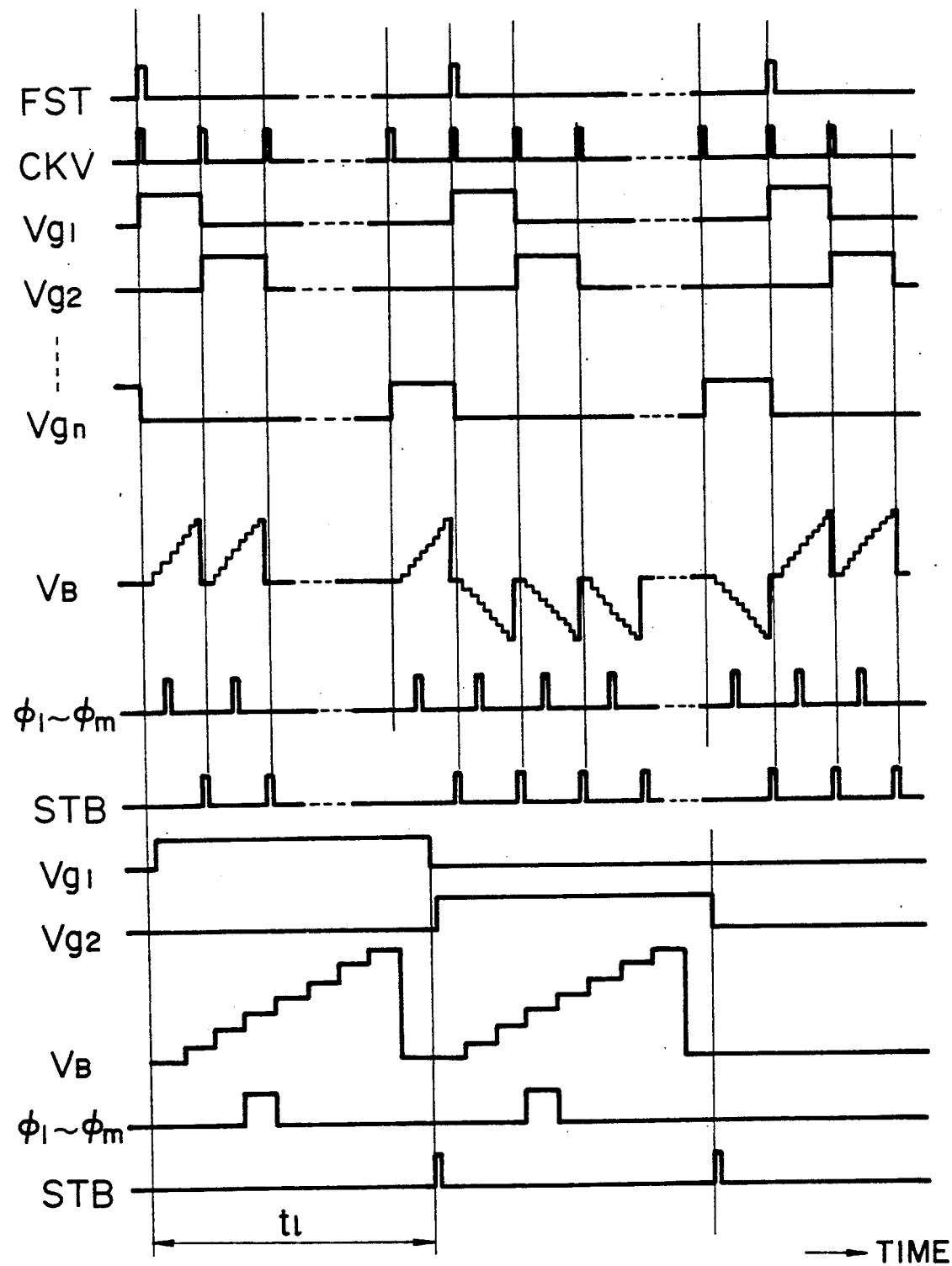

FIG. 17 shows another example of the timing chart. The brightness reference signal $V_B$ is sampled during a scanning period t1 for one line and inputted in the capacitors 29 to 31 before the beginning of the scanning period for the succeeding line.

By this method, the effective time of the signal voltages $V_{d1}$ to $V_{dm}$ is equal to t1.

Further, the sampling signals $\phi_1$ to $\phi_m$ may be formed by the pulse width control method indicated in FIG. 7. In addition the brightness reference signal $V_B$ may have the waveform indicated in FIG. 8.

The scanning circuits indicated in FIGS. 5, 13 and 15 are constructed preferably by using shift registers.

Figure 18:
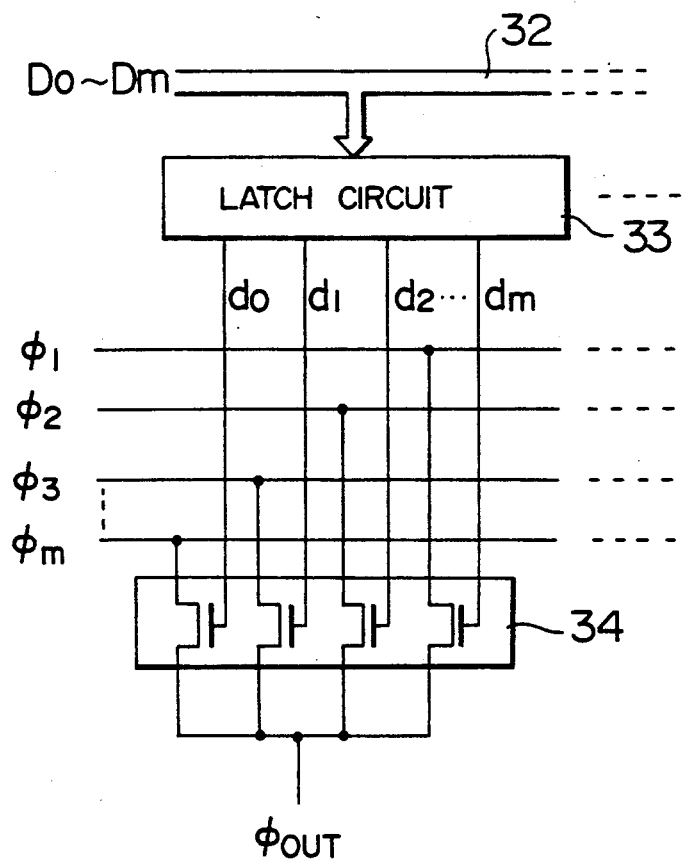
FIG. 18 is a block diagram illustrating an embodiment of the sampling control circuit.

On the other hand, it is conceivable to construct the sampling control circuit 4 by various methods. FIG. 18 illustrates another embodiment.

The sampling control circuit 4 is composed of latch circuits 33 and electronic switches 34. The display signals $D_0$ to $D_m$ are inputted in the latch circuits 33.

On the other hand, the sampling signals $\phi_1$ to $\phi_m$ are inputted in the electronic switches 34 and one of them is selected depending on the output of the latch circuits 33.

Further, the scanning circuit, the sampling control circuit and the sampling circuit indicated in FIG. 5, 13 or 15 may be constructed in one body with the TFT liquid crystal panel. They are constructed preferably specifically with a P-Si TFT.

Figure 24:
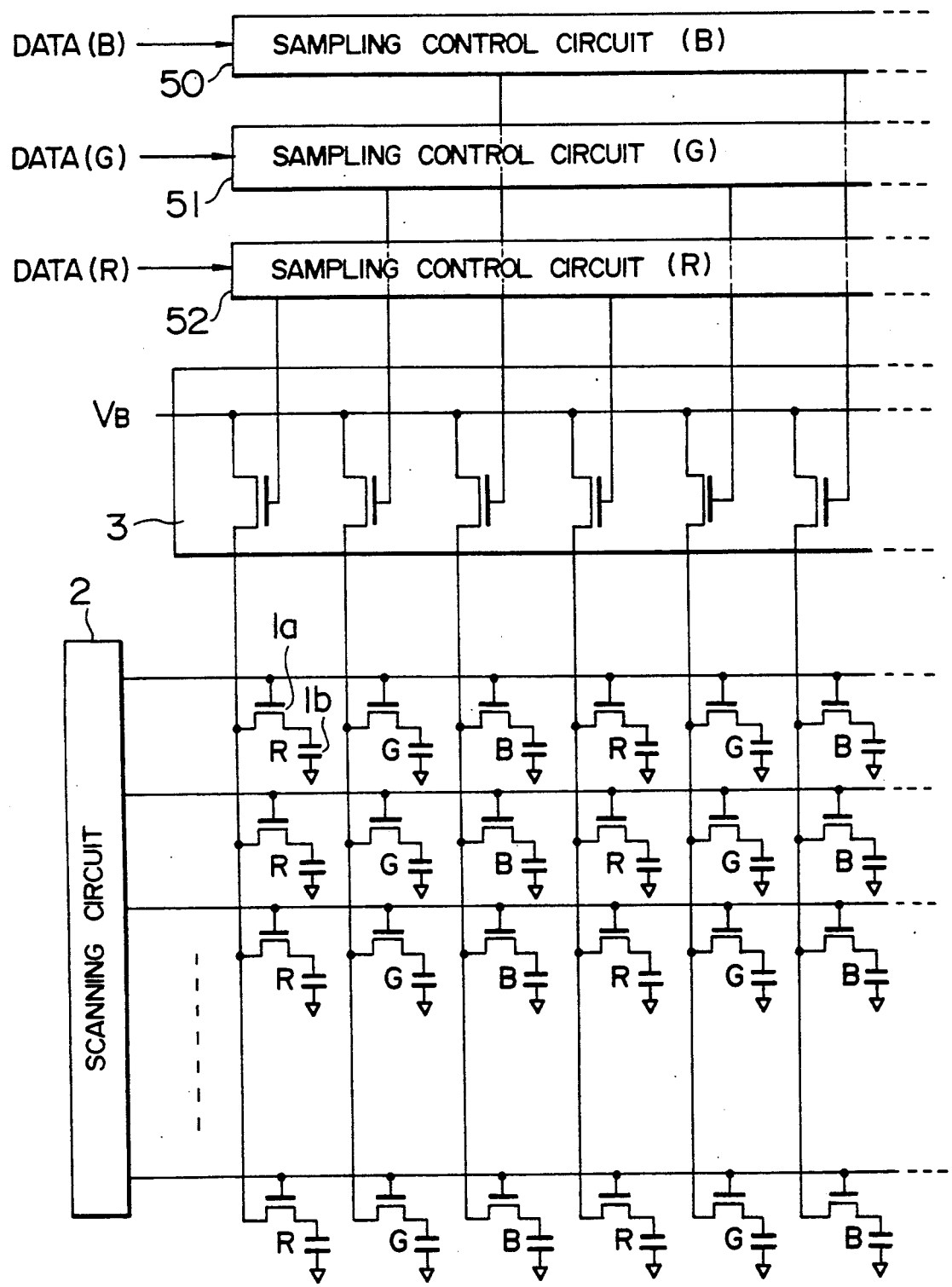
FIGS. 24 and 25 are block diagrams illustrating two different embodiments for the color display drive.

FIG. 24 illustrates an embodiment for the color display drive. In this embodiment the vertical color stripe display is shown, in which color filters of R (red), G (green) and B (blue) are arranged in the vertical direction. For this reason, sampling control circuits are disposed separately for different colors. Each of the sampling control circuits 50 to 52 has the same construction as that indicated in FIG. 21.

Further, the sampling circuit 3 may be disposed separately for different colors.

Figure 25:
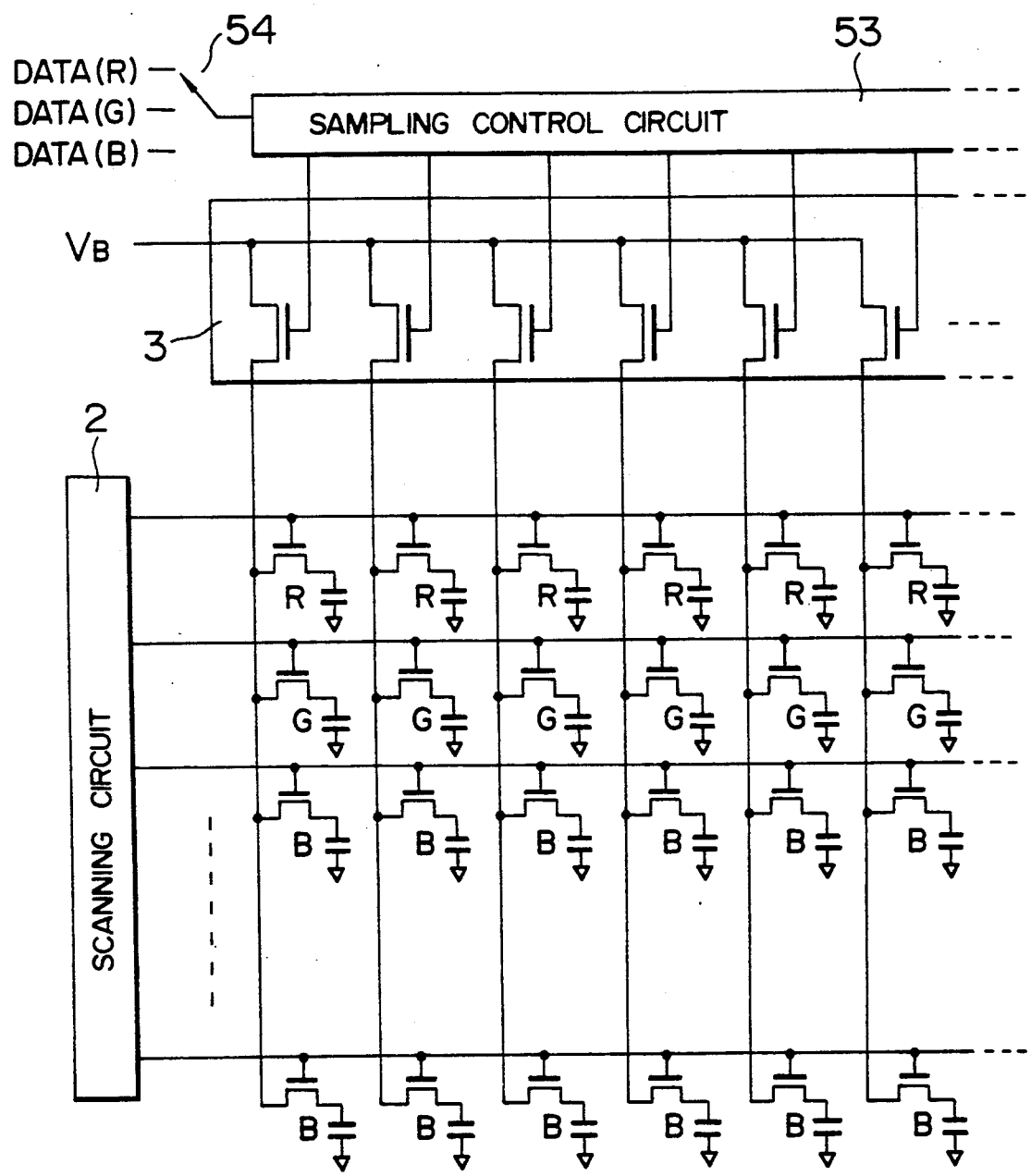

FIG. 25 illustrates another embodiment for the color display drive. In this embodiment, there is disposed only one sampling control circuit 53. The data signals to the sampling control circuit 53 are switched by a color selector 54 to take in the data signals for different colors of R, G and B separately.

Figure 26:
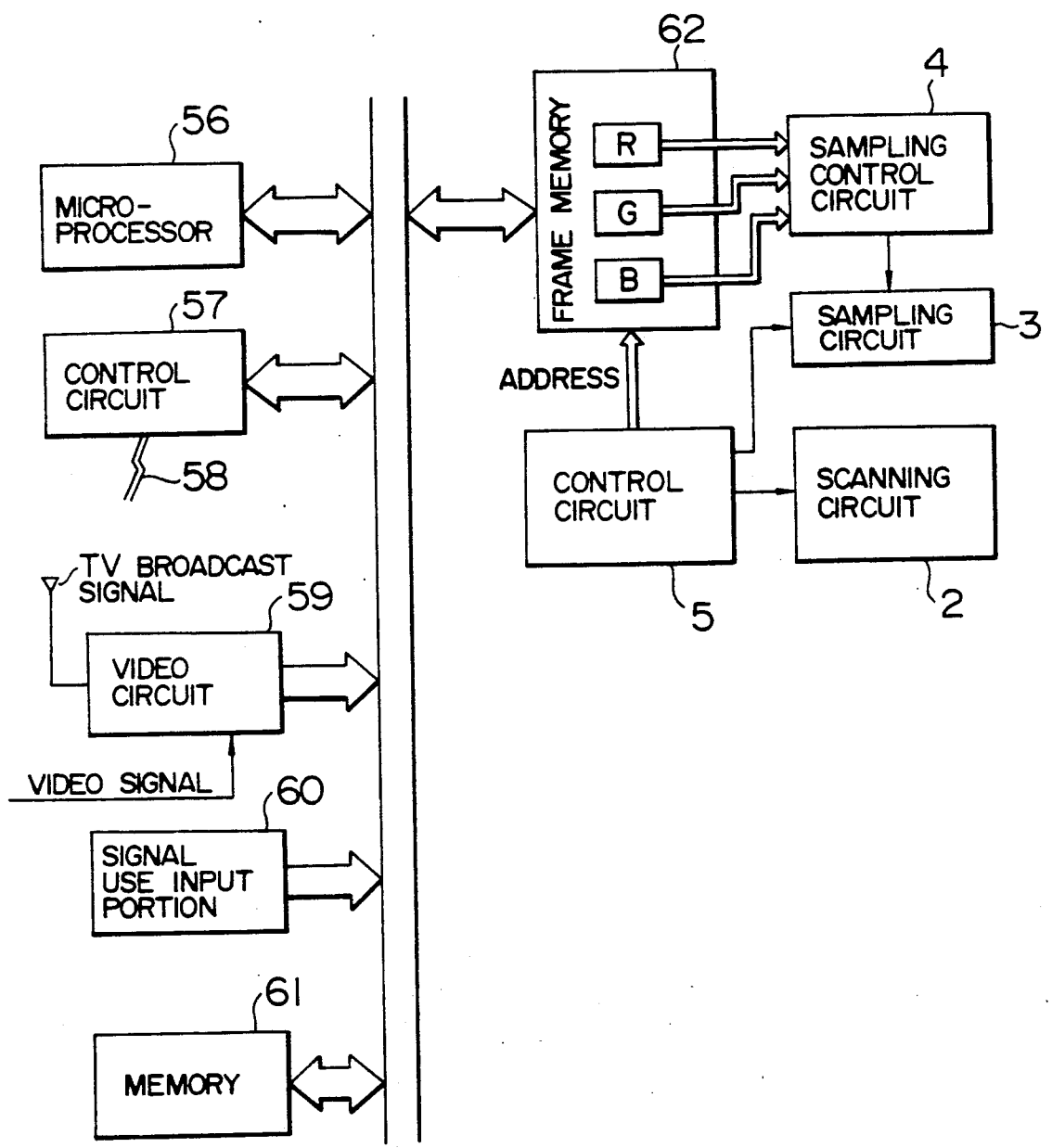
FIG. 26 is a block diagram illustrating an embodiment of the display system.

FIG. 26 is a scheme illustrating an embodiment of the display system. Data signals to be displayed, corresponding at least to one image, are stored in a frame memory 62. These are read out by an address signal coming from the control circuit 5 and transmitted to the sampling control circuit 4.

In the frame memory 62 are inputted data signals to be displayed coming from a microprocessor 56, a communication line 58 and each parts of a control circuit 57, a video circuit 59, a general use data input portion 60 and a memory 61 and inversely they can be also outputted therefrom.

The communication line 58 may be a line either in a wire system such as a telephonic network, etc. or in a wireless system such as a video text broadcast, POS, etc. The video circuit 59 executes processings such as transformation of analogue image signals as those for the TV broadcast, etc. into digital signals. Further, the general use data input portion 60 is provided with a keyboard, through which letters, numerals, etc. are inputted, an input touch keyboard e.g. of a menu type, etc. In addition the memory 61 may be any one of magnetic, optical, semiconductor memory devices, etc.

In an example of application of such a display device data inputted in the general use data input portion 60 may be edited on the display screen, or combined with image information coming from the video circuit 59 and stored in the memory frame 61. Information thus obtained may be transmitted also to a distant location through the communication line 58.

By this embodiment it is possible to effect three operations of monitoring, editing and transmission (in/output) of information and in this way to construct a system which is very useful to the mass communication society.

Although the object was a liquid crystal active matrix display in the embodiment described above, the application of this invention is not restricted thereto, and can be applied as well to the driving circuit of the signal circuit for a light emitting type display, whose brightness can be controlled by amplitude in voltage, such as an electroluminescence (EL), a plasma display (PDP), etc. The embodiment indicated in FIG. 15 can be applied for the construction of the driving circuit in this case.

According to this invention, it is possible to simplify the output circuit in the driving circuit and further to lower the speed of the operation of the circuit. In this way it becomes easy to construct the driving circuit by using ICs.

We claim:

1. A gray scale display device comprising:
   a display panel including a plurality of scanning electrodes, a plurality of signal electrodes intersecting the plurality of scanning electrodes, a plurality of switching elements respectively formed at positions corresponding to the intersections of the plurality of scanning electrodes and the plurality of signal electrodes, each switching element connected to the scanning electrode and the signal electrode of the corresponding intersection, and a plurality of display bodies, one display body connected to each switching element, each switching element responsive to a signal on the scanning electrode of the corresponding intersection for applying a signal voltage from the signal electrode of the corresponding intersection to the corresponding display body, each display body responsive to the applied signal voltage for exhibiting a brightness controlled by the amplitude of the applied signal voltage;

holding means for temporarily holding digital signals including gray scale information inputted in a unit of a predetermined number of bits and corresponding at least to the plurality of signal electrodes;

digital-time function transforming means for transforming the digital signals from the holding means into time function signals for each signal electrode;

means for providing a brightness reference signal;

time function-gray scale transforming means for sampling the brightness reference signal, responding to the time function signals, and generating gray scale signals based on the brightness reference signal at the times of the time function signals;

storage means for holding the generated gray scale signals;

strobe means for simultaneously applying the held gray scale signals as signal voltages to each of the signal electrodes; and scanning voltage generating means for generating a scanning voltage for successively scanning the plurality of scanning electrodes.

2. A gray scale display device according to claim 1 wherein the digital-time function transforming means transforms the digital signals into pulse phase time function signals.

3. A gray scale display device according to claim 1, wherein the digital-time function transforming means transforms the digital signals into pulse width time function signals.

4. A gray scale display device according to claim 1, wherein the digital-time function transforming means transforms the digital signals into time function signals of a voltage amplitude substantially equal to the voltage amplitude of the digital signals and the brightness reference signal providing means provides a brightness reference signal having a voltage amplitude greater than that of the digital signals and that of the time function signals.

5. A gray scale display device according to claim 1, wherein said switching elements are transistor elements.

6. A gray scale display device according to claim 1, wherein said display bodies are liquid crystal display bodies.

7. A gray scale display device according to claim 1 wherein said switching elements are two-terminal nonlinear elements.

8. A gray scale display device according to claim 1 wherein said brightness reference signal providing means provides a brightness signal having a voltage which varies with respect to time.

9. A gray scale display device according to claim 8, wherein the brightness reference signal providing means provides a brightness reference signal having a voltage which varies linearly with respect to time.

10. A gray scale display device according to claim 8, wherein the brightness reference signal providing means provides a brightness reference signal having a voltage which varies non-linearly with respect to time.

11. A gray scale display device comprising:

a display panel including a plurality of scanning electrodes, a plurality of signal electrodes intersecting the plurality of scanning electrodes, a plurality of switching elements respectively formed at positions corresponding to the intersections of the plurality of scanning electrodes and the plurality of signal electrodes, each switching element connected to the scanning electrode and the signal electrode of the corresponding intersection, and a plurality of display bodies, one display body connected to each switching element each switching element responsive to a signal on the scanning electrode of the corresponding intersection for applying a signal voltage from the signal electrode of the corresponding intersection to the corresponding display body, each display body responsive to the applied signal voltage for exhibiting a brightness controlled by the amplitude of the applied signal voltage;

analogue-digital transforming means for transforming analogue image signals into digital signals including gray scale information for each signal electrode;

holding means for temporarily holding the digital signals, the digital signals being inputted to the holding means in a unit of a predetermined number of bits and corresponding at least to the plurality of signal electrodes;

digital-time function transforming means for transforming the digital signals from the holding means into time function signals for each signal electrode;

means for providing a brightness reference signal;

time function-gray scale transforming means for sampling the brightness reference signal, responding to the time function signals, and generating gray scale signals based on the brightness reference signal at the times of the time function signals;

storage means for holding the generated gray scale signals;

strobe means for simultaneously applying the held gray scale signals as signal voltages to each of the signal electrodes; and scanning voltage generating means for generating a scanning voltage for successively scanning the plurality of scanning electrodes.

12. A gray scale display device according to claim 11, wherein the digital-time function transforming means transforms the digital signals into pulse phase time function signals.

13. A gray scale display device according to claim 11, wherein the digital-time function transforming means transforms the digital signals into pulse width time function signals.

14. A gray scale display device according to claim 11, wherein the digital-time function transforming means transforms the digital signals into function signals of a voltage amplitude substantially equal to the voltage amplitude of the digital signals and the brightness reference signal providing means provides a brightness reference signal having a voltage amplitude greater than that of the digital signals and that of the time function signals.

15. A gray scale display device according to claim 11, wherein said switching elements are transistor elements.

16. A gray scale display device according to claim 11, wherein said display bodes are liquid crystal display bodies.

17. A gray scale display device according to claim 11 wherein said switching elements are two-terminal non-linear elements.

18. A gray scale display device according to claim 11 wherein said brightness reference signal providing means provides a brightness signal having a voltage which varies with respect to time.

19. A gray scale display device according to claim 18, wherein the brightness reference signal providing means provides a brightness reference signal having a voltage which varies linearly with respect to time.

20. A gray scale display device according to claim 18, wherein the brightness reference signal providing means provides a brightness reference signal having a voltage which varies non-linearly with respect to time.

21. A gray scale display device comprising:

a display panel including a plurality of scanning electrodes, a plurality of signal electrodes intersecting the plurality of scanning electrodes, a plurality of switching elements respectively formed at positions corresponding to the intersections of the plurality of scanning electrodes and the plurality of signal electrodes, each switching element connected to the scanning electrode and the signal electrode of the corresponding intersection, and a plurality of display bodies, one display body connected to each switching element, each switching element responsive to a signal on the scanning electrode of he corresponding intersection for applying a signal voltage from the signal electrode of the corresponding intersection to the corresponding display body, each display body responsive to the applied signal voltage for exhibiting a brightness controlled by the amplitude of the applied signal voltage;

a frame memory for storing digital signals including gray scale information for each signal electrode and corresponding at least to one image;

holding means for temporarily holding the digital signals, the digital signals being inputted to the holding means in a unit of a predetermined number of bits from the frame memory and corresponding at least to the plurality of signal electrodes;

digital-time function transforming means for transforming the digital signals from the holding means into the time function signals for each signal electrode;

means for providing a brightness reference signal;

time function-gray scale transforming means for sampling the brightness reference signal, responding to the time function signals, and generating gray scale signals based on the brightness reference signal at the time of the time function signals;

storage means for holding the generated gray scale signals;

strobe means for simultaneously applying the held gray scale signals as signal voltages of each of the signal electrodes; and scanning voltage generating means for generating a scanning voltage for successively scanning the plurality of scanning electrodes.

22. A gray scale display device according to claim 21, wherein the digital-time function transforming means transforms the digital signals into pulse phase time function signals.

23. A gray scale display device according to claim 21, wherein the digital-time function transforming means transforms the digital signals into pulse width time function signals.

24. A gray scale display device according to claim 21, wherein the digital-time function transforming means transforms the digital signal into time function signals of a voltage amplitude substantially equal to the voltage amplitude of the digital signals and the brightness reference signal providing means provides a brightness reference signal having a voltage amplitude greater than that of the digital signals and that of the time function signals.

25. A gray scale display device according to claim 21, wherein said switching elements are transistor elements.

26. A gray scale display device according to claim 21, wherein said switching elements are two-terminal non-linear elements.

27. A gray scale display device according to claim 21, wherein said display bodies are liquid crystal display bodies.

28. A gray scale display device according to claim 21, wherein said brightness reference signal providing means provides a brightness signal having a voltage which varies with respect to time.

29. A gray scale display device according to claim 28, wherein the brightness reference signal providing means provides brightness reference signal having a voltage which varies linearly with respect to time.

30. A gray scale display device according to claim 28, wherein the brightness reference signal providing means provides a brightness reference signal having a voltage which varies non-linearly with respect to time.

31. A gray scale display device comprising:

a display panel including a plurality of scanning electrodes, a plurality of signal electrodes intersecting the plurality of scanning electrodes, a plurality of switching elements respectively formed at positions corresponding to the intersections of the plurality of scanning electrodes and the plurality of signal electrodes, each switching element connected to the scanning electrode and the signal electrode of the corresponding intersection, and a plurality of display bodies, one display body connected to each switching element, each switching element responsive to a signal on the scanning electrode of the corresponding intersection for applying a signal voltage from the signal electrode of the corresponding intersection to the corresponding display body, each display body responsive to the applied signal voltage for exhibiting a brightness controlled by the amplitude of the applied signal voltage;

analogue-digital transforming means for transforming analogue image signals into digital signals including gray scale information for each signal electrode;

a frame memory for storing the digital signals, the digital signals corresponding at least to one image;

holding means for temporarily holding the digital signals, the digital signals being inputted to the holding means in a unit of a predetermined number of bits from the frame memory and corresponding at least to the plurality of signal electrodes;

digital-time function transforming means for transforming the digital signals from the holding means into time function signals from each signal electrode;

time function-gray scale transforming means for sampling a brightness reference signal varying with respect to time, responding to said time function signals and generating gray scale signals corresponding to said signal voltage applied to each of said signal electrodes; and scanning voltage generating means for generating signals corresponding to a scanning voltage for successively scanning said plurality of scanning electrodes.

32. A gray scale display device according to claim 31, wherein the digital-time function transforming means transforms the digital signals into pulse phase time function signals.

33. A gray scale display device according to claim 31, wherein the digital-time function transforming means transforms the digital signals into pulse width time function signals.

34. A gray scale display device according to claim 31, wherein the digital-time function transforming means transforms the digital signals into time function signals of a voltage amplitude substantially equal to the voltage amplitude of the digital signals and the brightness reference signal providing means provides a brightness reference signal having a voltage amplitude greater than that of the digital signals and that of the time function signals.

35. A gray scale display device according to claim 31, wherein said switching elements are transistor elements.

36. A gray scale display device according to claim 31, wherein said display bodies are liquid crystal display bodies.

37. A gray scale display device according to claim 31 wherein said switching elements are two-terminal non-linear elements.

38. A gray scale display device according to claim 31, wherein said brightness reference signal providing means provides a brightness signal having a voltage which varies with respect to time.

39. A gray scale display device according to claim 38, wherein the brightness reference signal providing means provides a brightness reference signal having a voltage which varies linearly with respect to time.

40. A gray scale display device according to claim 38, wherein the brightness reference signal providing means provides a brightness reference signal having a voltage which varies non-linearly with respect to time.

* * * * *